(12) United States Patent
Ishida et al.

(10) Patent No.: US 8,717,655 B2
(45) Date of Patent: May 6, 2014

(54) IMAGE FORMING APPARATUS

(75) Inventors: Daisuke Ishida, Fujimi (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 476 days.

(21) Appl. No.: 13/081,613

(22) Filed: Apr. 7, 2011

(65) Prior Publication Data
US 2011/0249312 A1 Oct. 13, 2011

(30) Foreign Application Priority Data
Apr. 8, 2010 (JP) ................................. 2010-089271

(51) Int. Cl.
*G02B 26/08* (2006.01)
*G03B 21/26* (2006.01)

(52) U.S. Cl.
USPC .................. 359/202.1; 359/198.1; 359/199.1; 359/201.2; 353/30; 353/36

(58) Field of Classification Search
USPC ............ 359/201.1–202.1; 353/30, 34, 36, 37, 353/50–51; 348/201, 205
See application file for complete search history.

(56) References Cited

U.S. PATENT DOCUMENTS

| | | | |
|---|---|---|---|
| 7,130,095 | B1 | 10/2006 | Wood |
| 7,492,495 | B2 | 2/2009 | Ishihara et al. |
| 2010/0231870 | A1 | 9/2010 | Chikaoka et al. |
| 2011/0051210 | A1* | 3/2011 | Chikaoka et al. .......... 359/199.1 |

FOREIGN PATENT DOCUMENTS

| | | |
|---|---|---|
| JP | 2007-199251 | 8/2007 |
| JP | 2008-116668 | 5/2008 |
| JP | 2008-547054 A | 12/2008 |
| JP | 2010-217372 | 9/2010 |
| WO | WO-2007-001680 A1 | 1/2007 |

* cited by examiner

*Primary Examiner* — James Phan
(74) *Attorney, Agent, or Firm* — Harness, Dickey & Pierce, P.L.C.

(57) ABSTRACT

An image forming apparatus includes a light output unit that outputs light and a light scanning unit that includes at least one light reflection part reflecting the light output from the light output unit, and scans a display surface in a first direction at a first speed and scans the surface in a second direction orthogonal to the first direction at a second speed lower than the first speed with the light reflected by the light reflection part, wherein a drawable region in which an image can be formed on the display surface by scanning with the light has at least two parts of a part in which a length of the drawable region in the first direction increases, a part in which the length decreases, and a part in which the length is maintained constant from a first side toward a second side in the second direction.

6 Claims, 19 Drawing Sheets

IMAGE FORMING APPARATUS

BACKGROUND

1. Technical Field

The present invention relates to an image forming apparatus.

2. Related Art

As an apparatus that projects light on a surface of an object such as a screen and displays a desired image on the projection surface of the screen has been known. As the projector, one using a light scanner for one-dimensional or two-dimensional scanning with light has been put into practice (for example, see Patent Document 1 (JP-A-2008-116668)).

The projector described in Patent Document 1 has a first light scanner in which a movable plate having a light reflection part rotates around the x-axis, a second light scanner in which a movable plate having a light reflection part rotates around the y-axis, and a light source unit that outputs light such as a laser. In the projector, scanning is performed with the light output from the light source unit using the first light scanner, scanning is performed with the light used for the scanning using the second light scanner, and thereby, two-dimensional scanning is performed with light and a desired image is displayed on a screen.

In the projector, the shape and size of a drawable region as a region where an image can be displayed (a range in which light scanning can be performed on the display surface) are always constant, and the image is displayed in the region at constant resolution.

Accordingly, in the projector described in Patent Document 1, the area of the region with no image formed of the drawable region may become larger depending on the shape (outer shape) and the size of the image to be displayed. In this case, the ratio of the period for image drawing in one frame (so-called time-aperture ratio) becomes lower. The lower time-aperture ratio means the lower energy efficiency.

Further, in the case where the shape and size of the screen is largely different from the shape and size of the drawable region, the area of the part off-screen of the drawable region becomes larger, or the area of the part not the drawable region of the region on the screen becomes larger. This case is not efficient.

SUMMARY

An advantage of some aspects of the invention is to provide an image forming apparatus that can display images by efficient scanning with light.

An image forming apparatus according to an aspect of the invention includes a light output unit that outputs light, and a light scanning unit that includes at least one light reflection part reflecting the light output from the light output unit, and scans a display surface in a first direction at a first speed and scans the display surface in a second direction orthogonal to the first direction at a second speed lower than the first speed with the light reflected by the light reflection part, wherein a drawable region in which an image can be formed on the display surface by scanning with the light has at least two parts of a part in which a length of the drawable region in the first direction increases, a part in which the length decreases, and a part in which the length is maintained constant from a first side toward a second side in the second direction.

Thereby, the area of the region with no image formed of the drawable region where drawing can be performed, the area of the part off-screen of the display surface of the drawable region, and the area of the part not the drawable region of the region of the display surface may be made smaller. As a result, images may be displayed by efficient scanning with light.

An image forming apparatus according to another aspect of the invention includes a light output unit that outputs light, a light scanning unit that includes at least one light reflection part reflecting the light output from the light output unit, and scans a display surface in a first direction at a first speed and scans the display surface in a second direction orthogonal to the first direction at a second speed lower than the first speed with the light reflected by the light reflection part, and an angle control part that controls a deflection angle of the light reflection part by combining at least two periods of a period in which the deflection angle of the light reflection part in the first direction is increased, a period in which the deflection angle is decreased, and a period in which the deflection angle is maintained constant while the light reflection part performs scanning with light once.

Thereby, the area of the region with no image formed of the drawable region where drawing can be performed, the area of the part off-screen of the display surface of the drawable region, and the area of the part not the drawable region of the region of the display surface may be made smaller. As a result, images may be displayed by efficient scanning with light.

In the image forming apparatus according to the aspect of the invention, it is preferable that the angle control part controls the deflection angle of the light reflection part for scanning in the first direction based on image information containing information on a shape of an image to be displayed on the display surface.

Thereby, the area of the region with no image formed of the drawable region where drawing can be performed may be made smaller.

In the image forming apparatus according to the aspect of the invention, it is preferable that the angle control part controls the deflection angle of the light reflection part for scanning in the first direction so that an outer shape of the drawable region in which the image can be formed on the display surface by scanning with the light may correspond to an outer shape of the image to be displayed on the display surface.

Thereby, the area of the region with no image formed of the drawable region where drawing can be performed may easily and reliably be made smaller.

In the image forming apparatus according to the aspect of the invention, it is preferable that the angle control part controls the deflection angle of the light reflection part for scanning in the first direction based on display surface information containing information on a shape of a display object having the display surface.

Thereby, the area of the part off-screen of the display surface of the drawable region and the area of the part not the drawable region of the region of the display surface may be made smaller.

In the image forming apparatus according to the aspect of the invention, it is preferable that the light scanning unit includes a drive part that rotates the light reflection part by periodically changing supply of a current or a voltage, and the angle control part controls the deflection angle of the light reflection part for scanning in the first direction by adjusting a magnitude or a frequency of the current or the voltage.

Thereby, the deflection angle of the light reflection part may relatively easily and reliably be changed.

In the image forming apparatus according to the aspect of the invention, it is preferable that the light output unit outputs a laser beam.

Thereby, even when the deflection angle of the light reflection part is changed, image blur may easily be prevented. Further, close projection may be performed with free focus, and the projection position may be adjusted to an arbitrary position independent of the installation position. Furthermore, by using laser beams, the optical systems including lenses for forming parallel light etc. may be omitted or simplified, and downsizing of the light output unit and downsizing of the image forming apparatus may be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an image forming apparatus of the invention will be described with reference to the accompanying drawings.

First Embodiment

Figure 1:
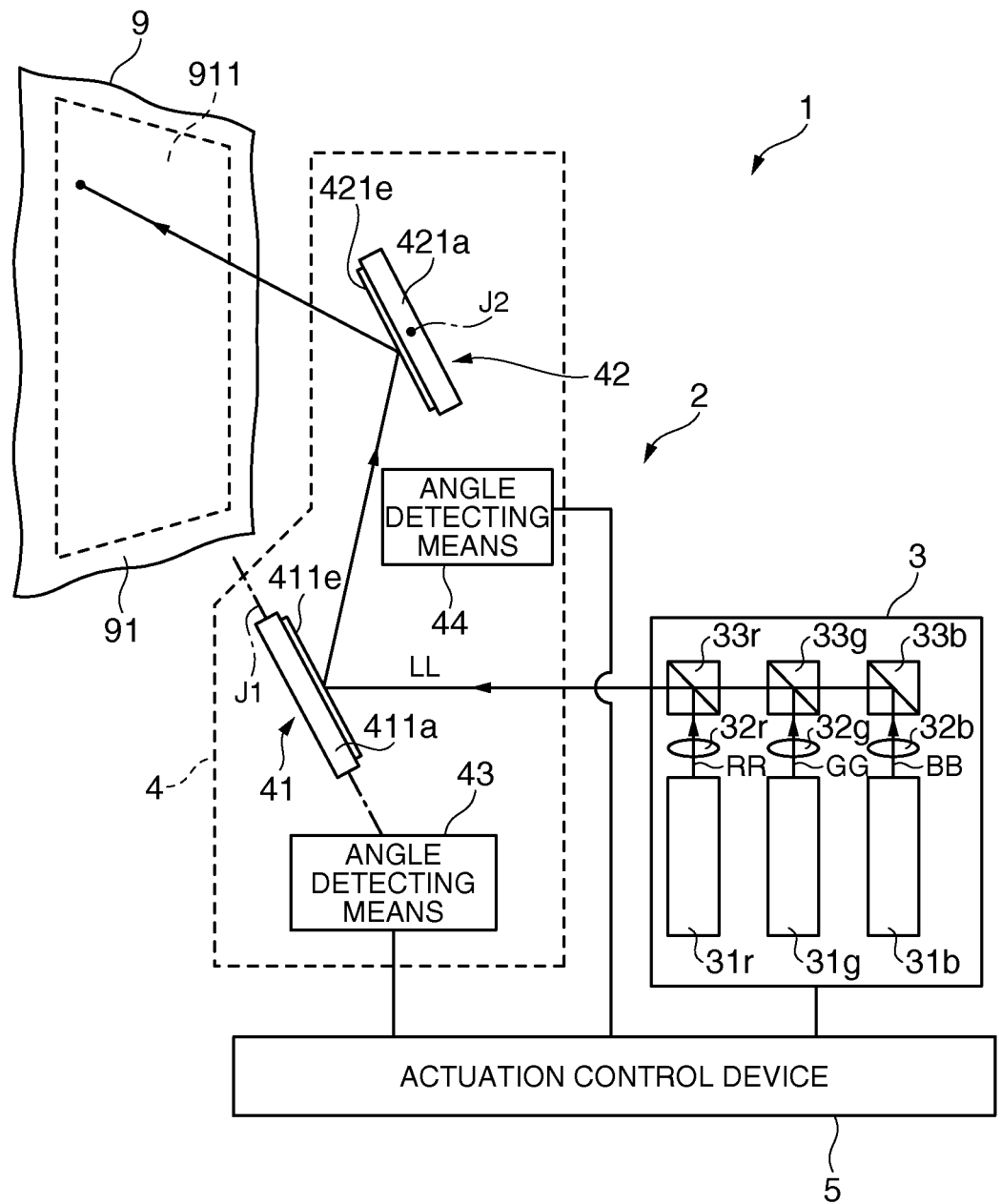
FIG. 1 shows the first embodiment of an image forming apparatus of the invention.
Figure 2:
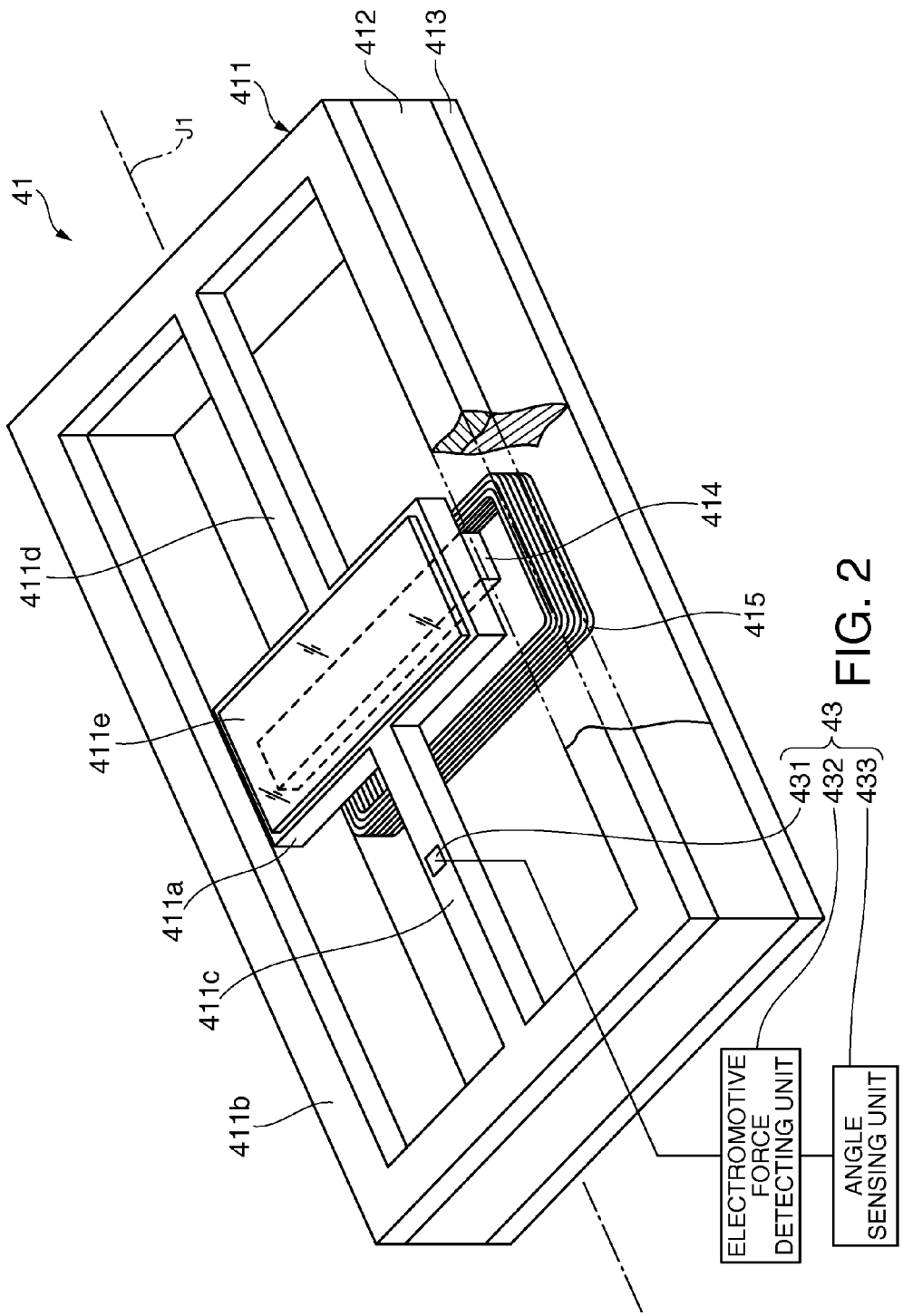
FIG. 2 is a partial sectional perspective view of a light scanner provided in a light scanning unit of the image forming apparatus shown in FIG. 1.
Figure 3A:
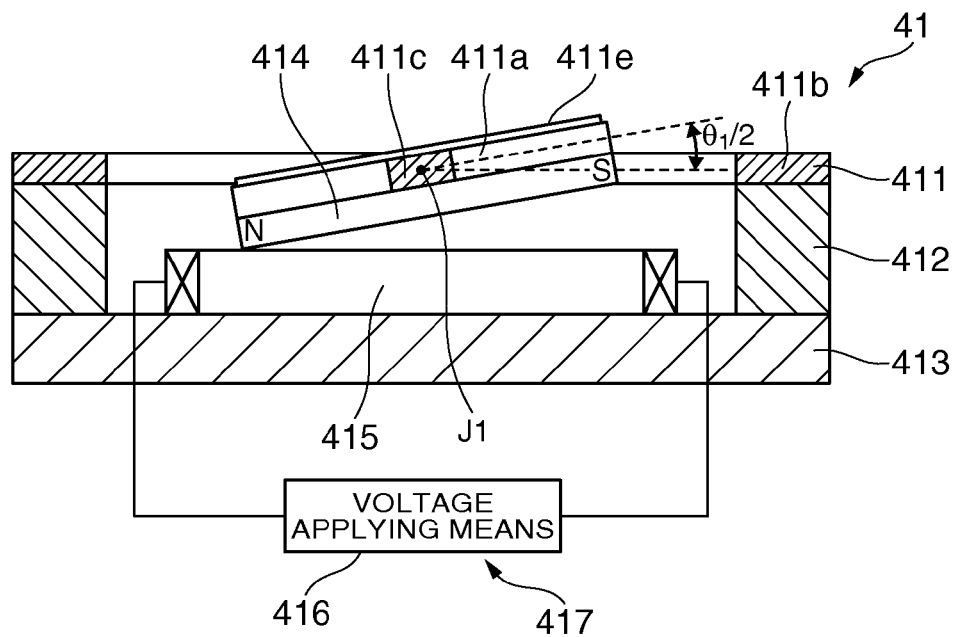
FIGS. 3A and 3B are sectional views for explanation of an operation of the light scanner shown in FIG. 2.
Figure 3B:
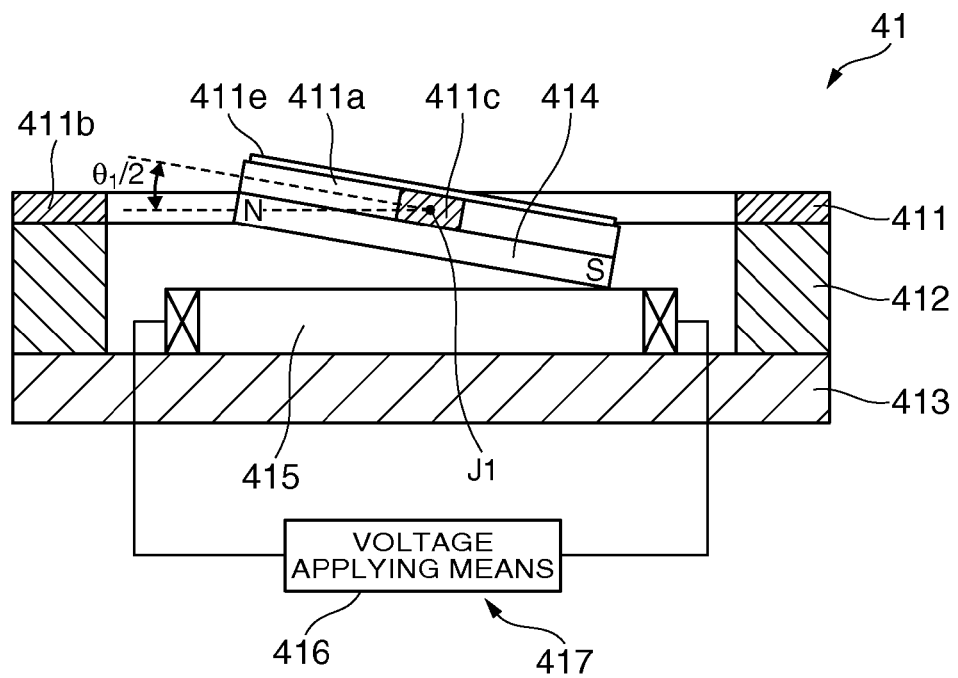
Figure 4:
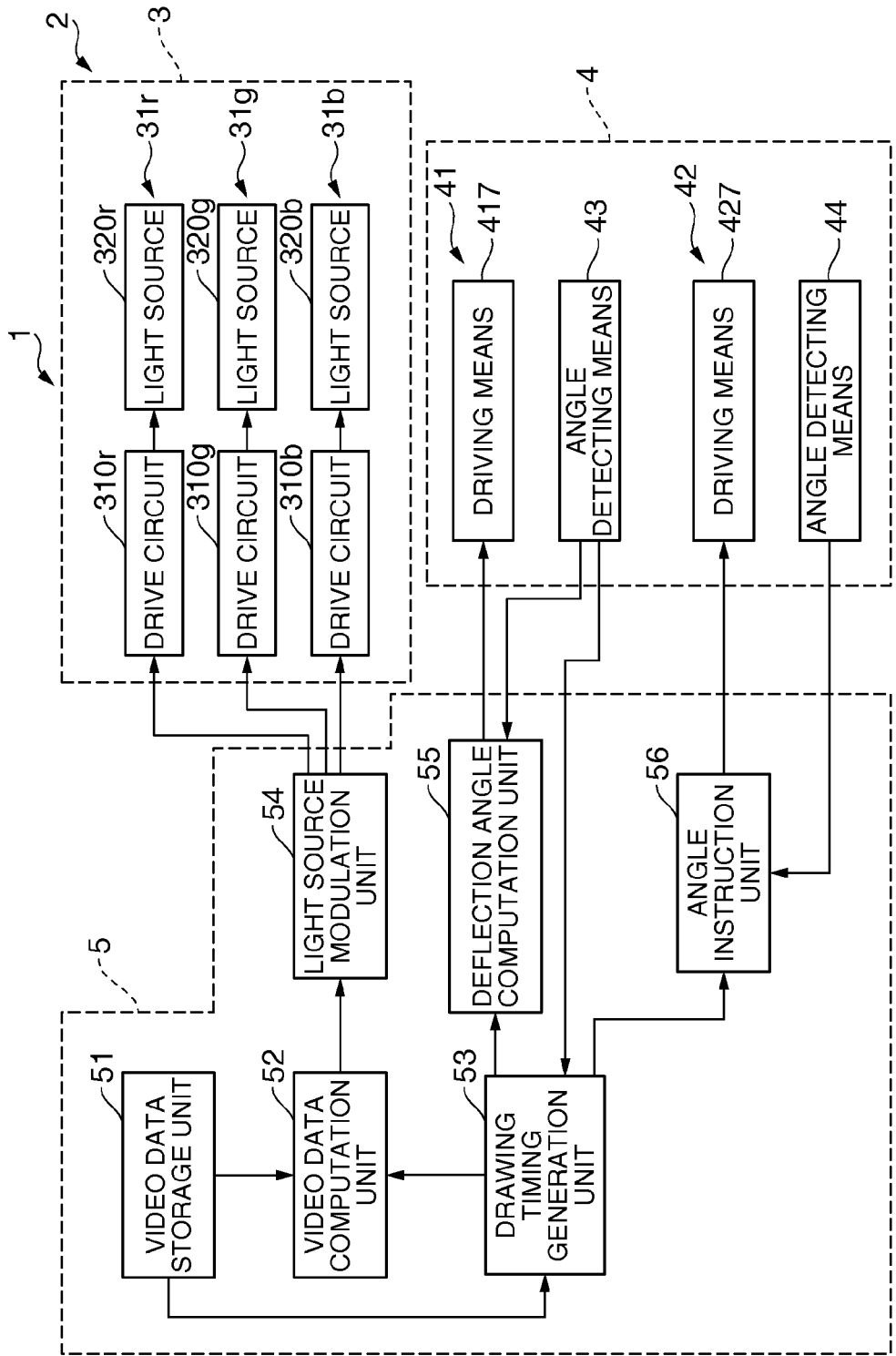
FIG. 4 is a block diagram showing a control system (an actuation control device, the light scanning unit, and a light source unit) of the image forming apparatus shown in FIG. 1.
Figure 5:
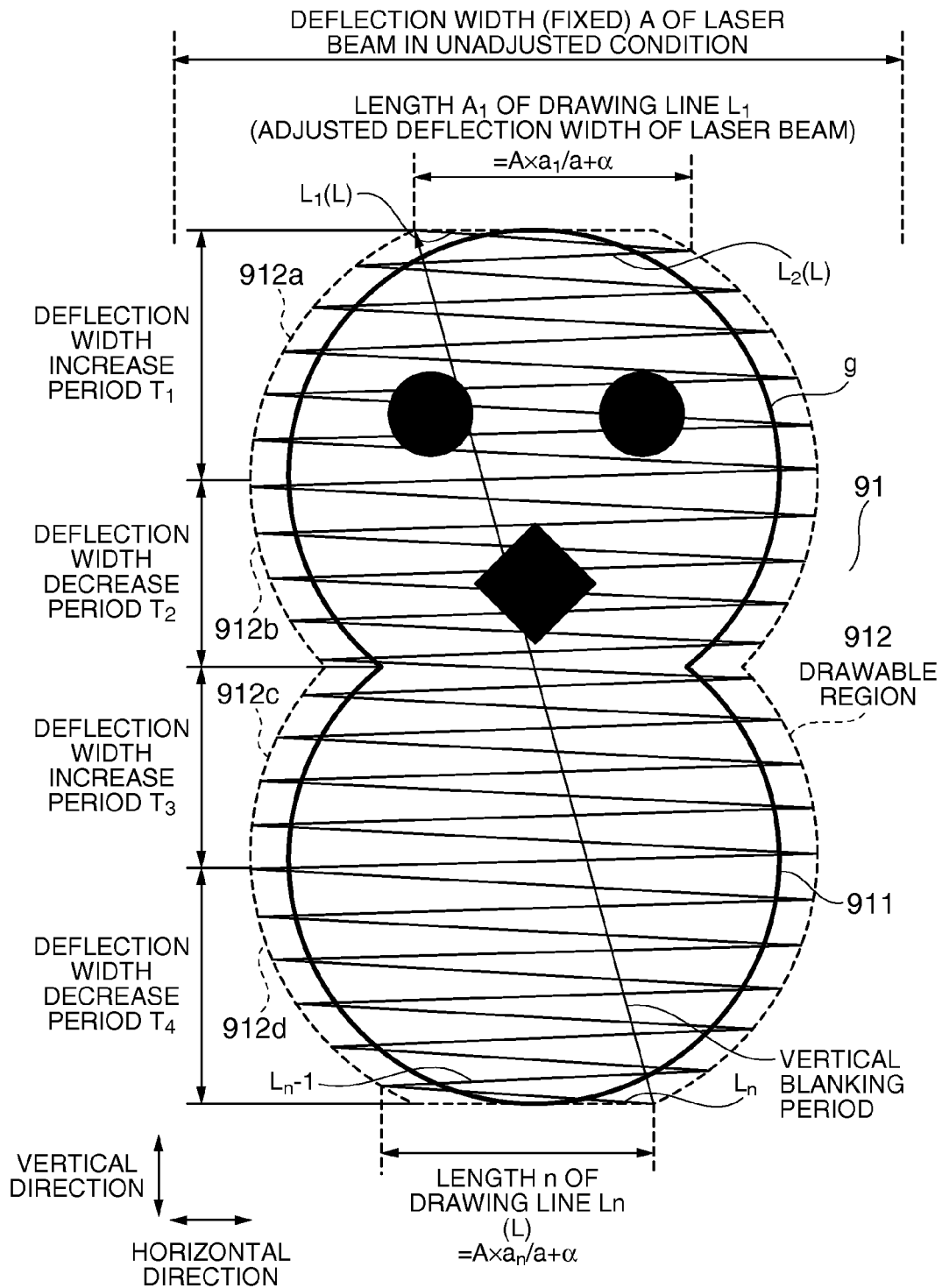
FIG. 5 is a diagram for explanation of an operation of the image forming apparatus shown in FIG. 1 (a diagram for explanation of a drawable region, a drawing region, and an image).
Figure 6:
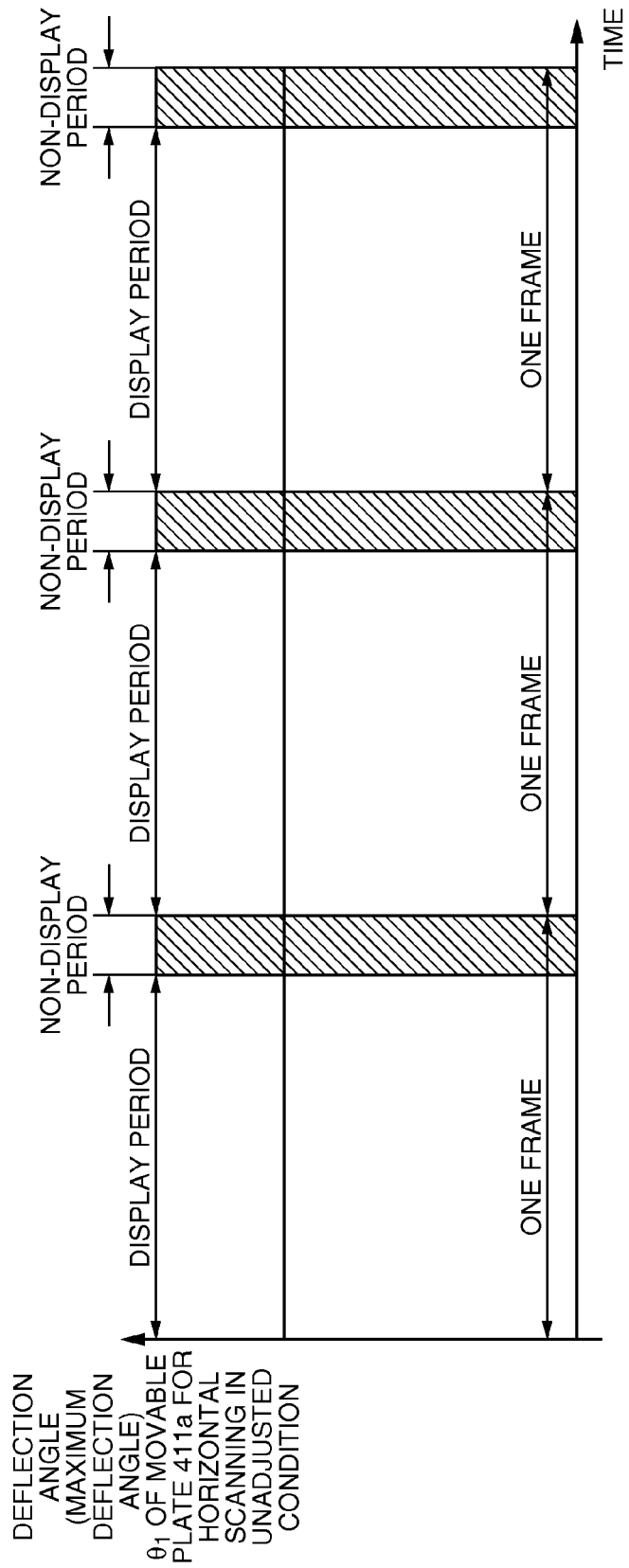
FIG. 6 is a graph showing a transition (non-adjusted) of a deflection angle of a movable plate of a light scanner (a light scanner for horizontal scanning) of the image forming apparatus shown in FIG. 1.
Figure 7:
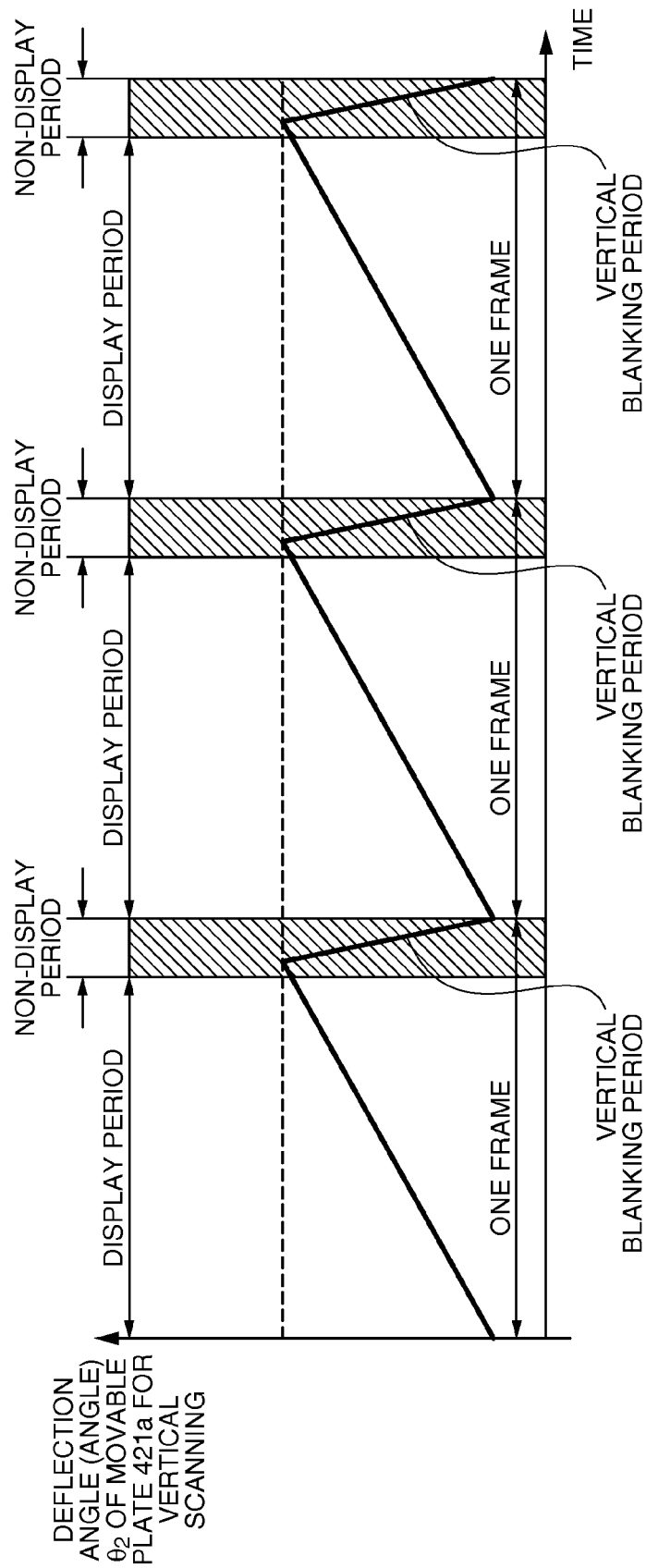
FIG. 7 is a graph showing a transition of a deflection angle of a movable plate of a light scanner (a light scanner for vertical scanning) of the image forming apparatus shown in FIG. 1.
Figure 8:
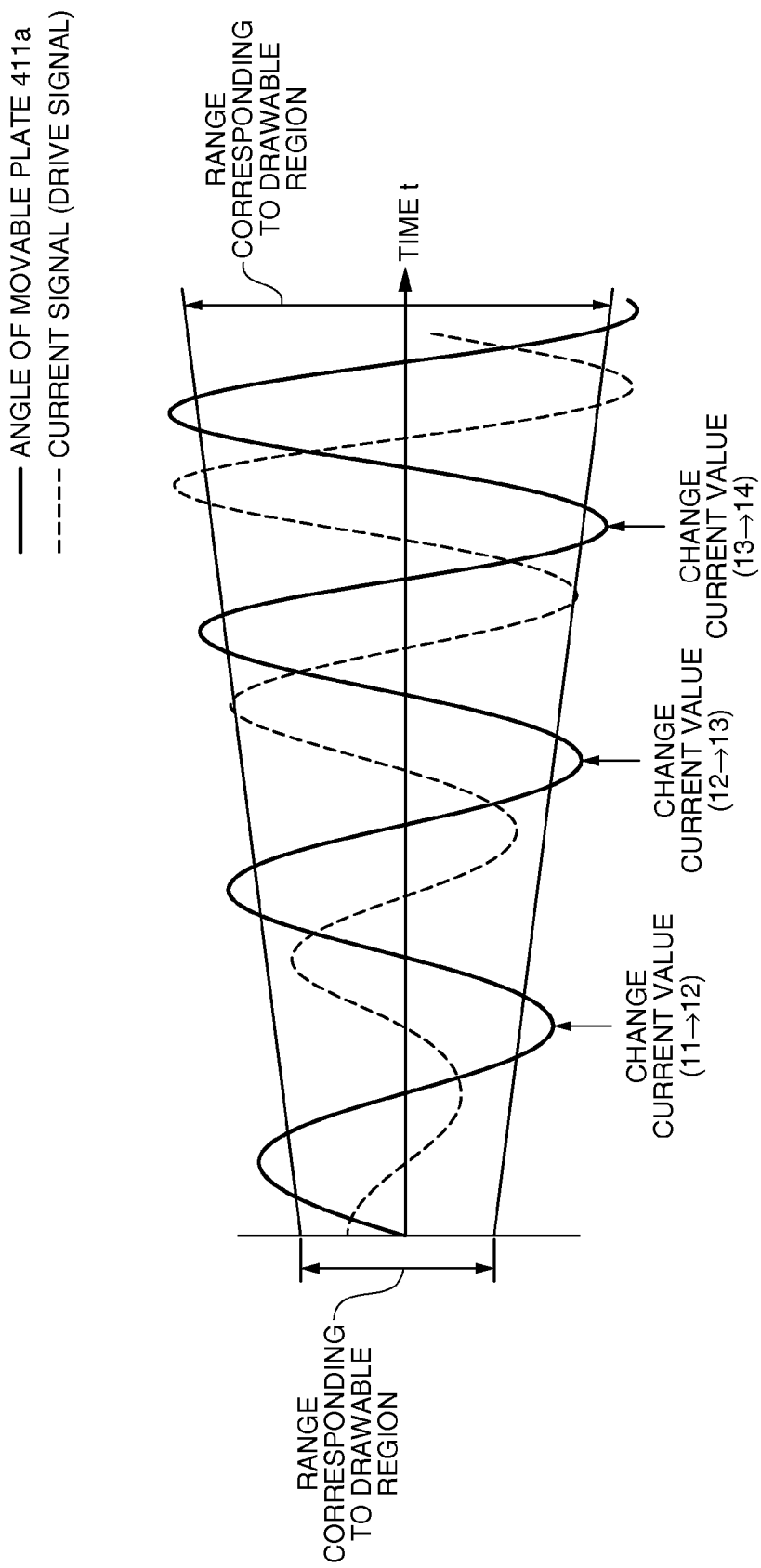
FIG. 8 is a graph showing a drive signal and an angle of the movable plate (a period in which the deflection angle is increased) of the light scanner for horizontal scanning of the image forming apparatus shown in FIG. 1.
Figure 9:
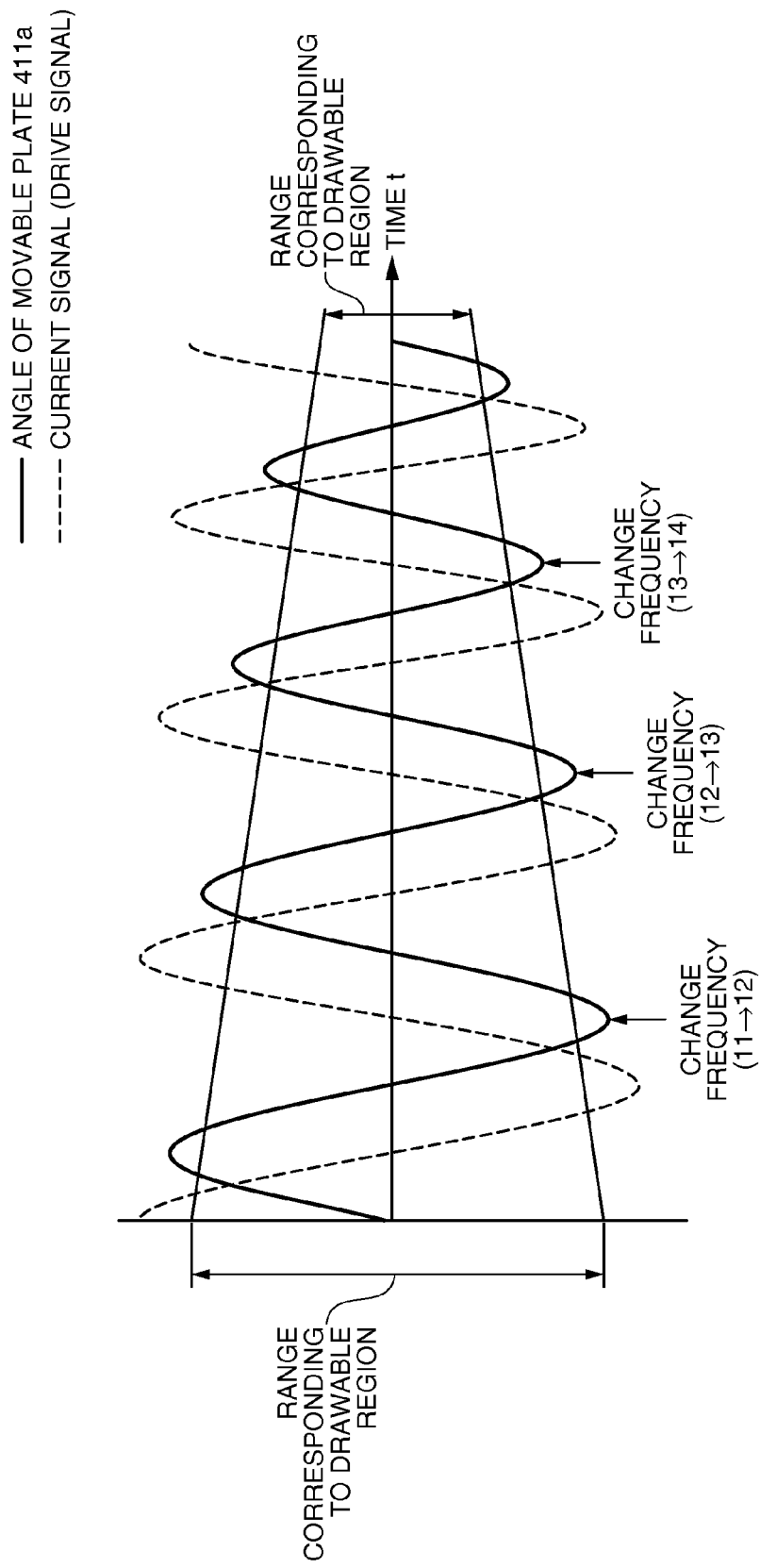
FIG. 9 is a graph showing a drive signal and an angle of the movable plate (a period in which the deflection angle is decreased) of the light scanner for horizontal scanning of the image forming apparatus shown in FIG. 1.
Figure 10:
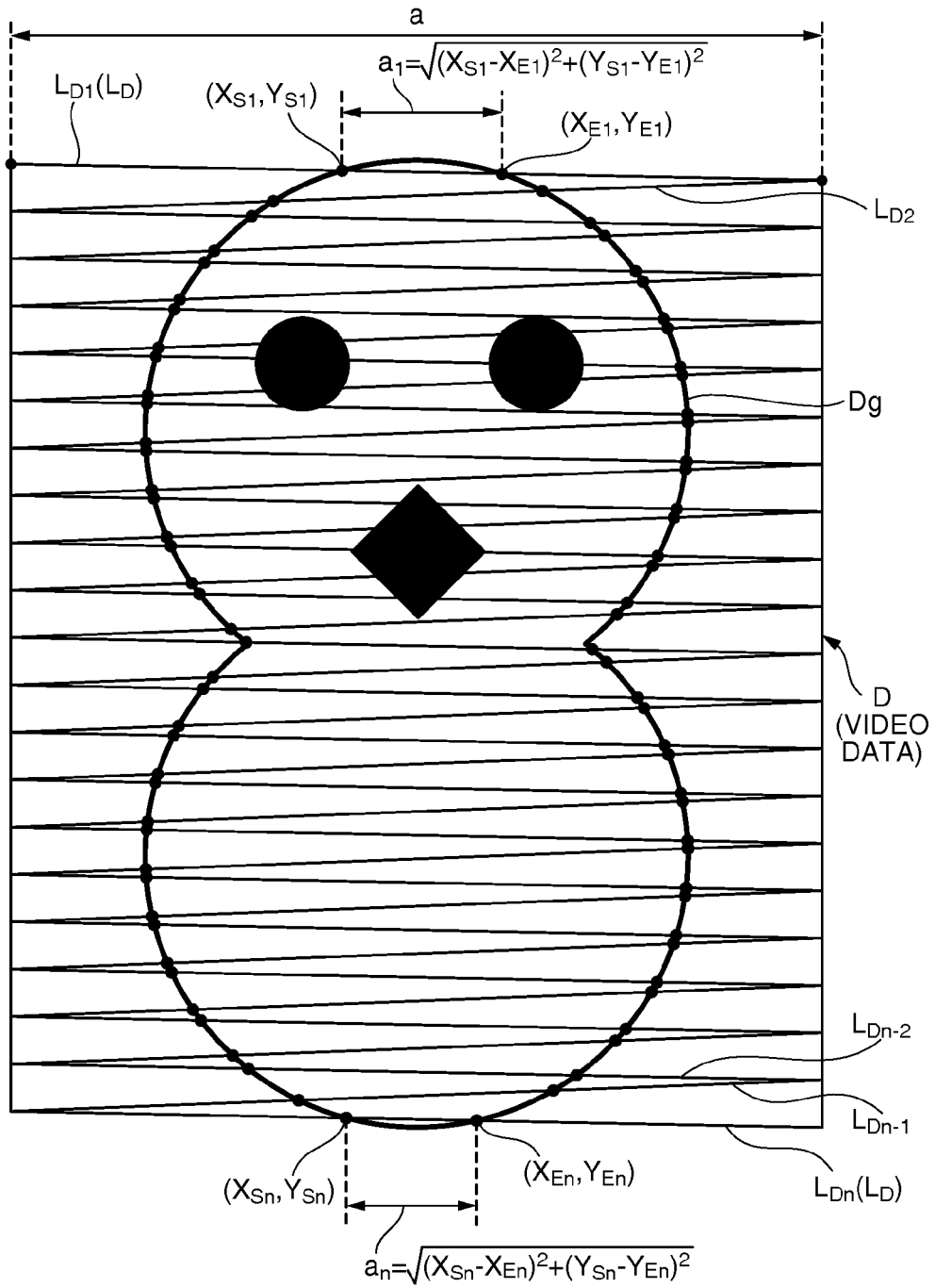
FIG. 10 is a diagram for explanation of a first example of a method of determining a deflection width of a laser beam shown in FIG. 5 based on video data.
Figure 11:
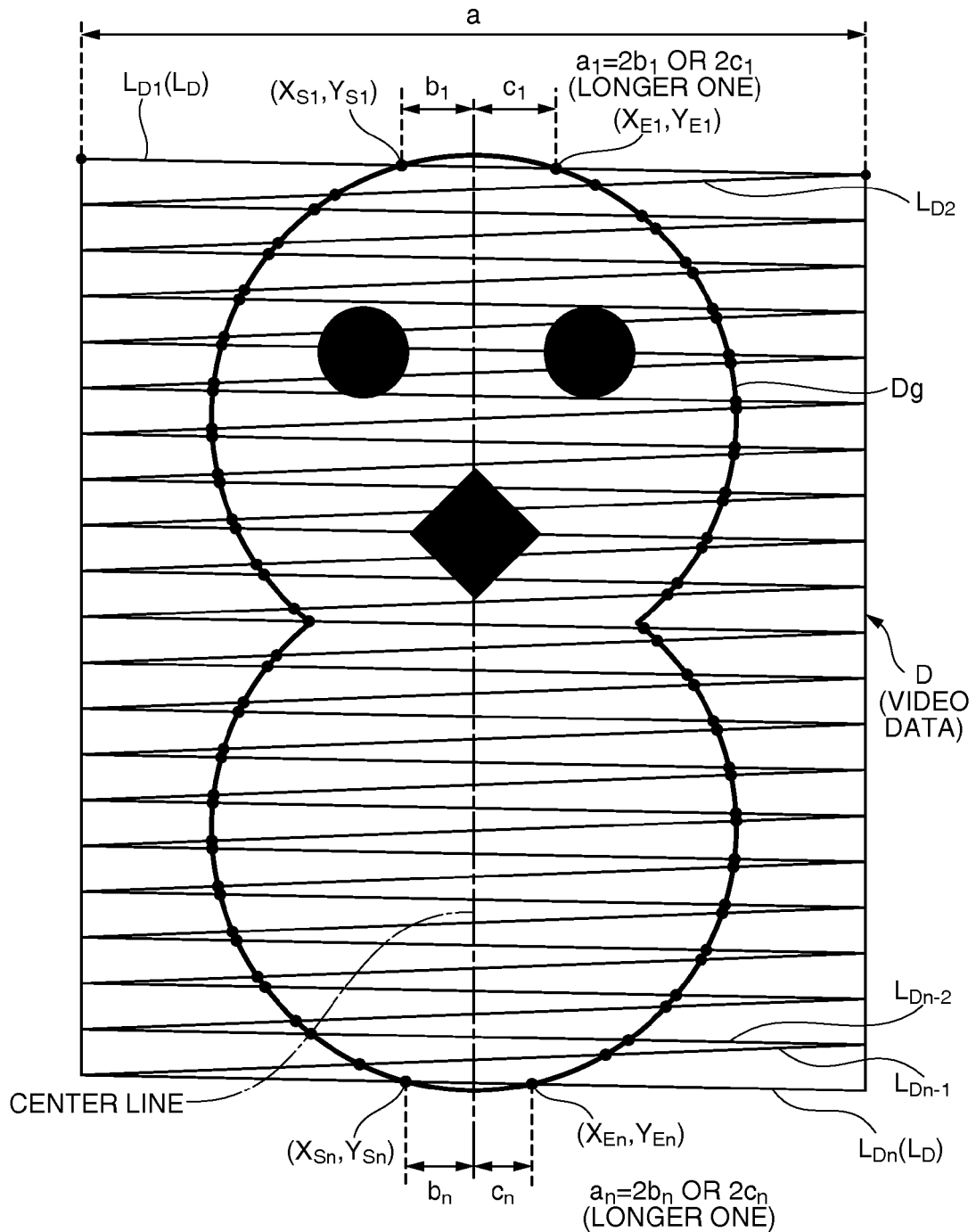
FIG. 11 is a diagram for explanation of a second example of the method of determining the deflection width of the laser beam shown in FIG. 5 based on video data.
Figure 12:
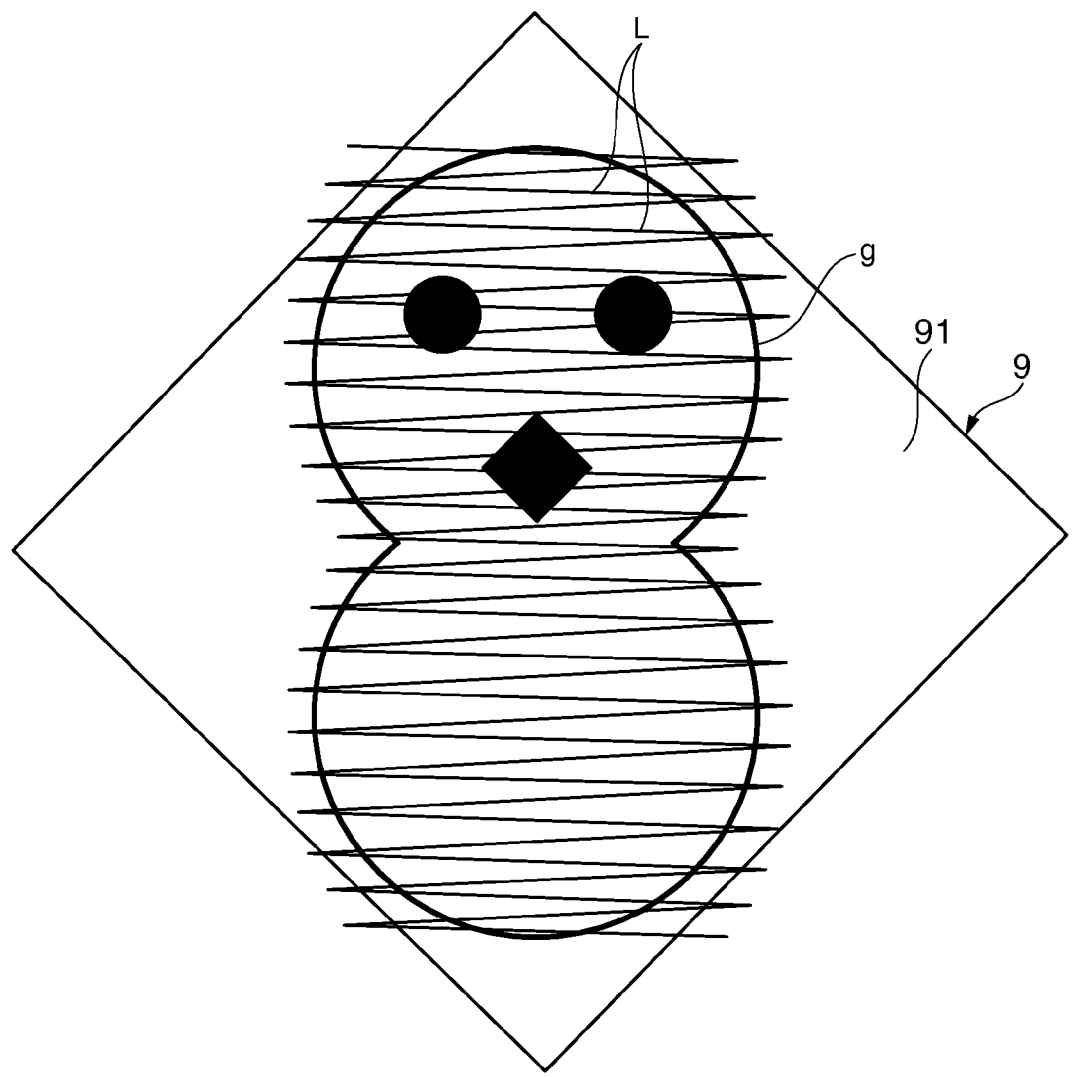
FIG. 12 shows a modified example of a display surface on which the drawable region, the drawing region, and the image shown in FIG. 5 are formed.

FIG. 1 shows a first embodiment of an image forming apparatus of the invention, FIG. 2 is a partial sectional perspective view of a light scanner provided in a light scanning unit of the image forming apparatus shown in FIG. 1, FIGS. 3A and 3B are sectional views for explanation of an operation of the light scanner shown in FIG. 2, FIG. 4 is a block diagram showing a control system (an actuation control device, the light scanning unit, and a light source unit) of the image forming apparatus shown in FIG. 1, FIG. 5 is a diagram for explanation of an operation of the image forming apparatus shown in FIG. 1 (a diagram for explanation of a drawable region, a drawing region, and an image), FIG. 6 is a graph showing a transition (non-adjusted) of a deflection angle of a movable plate of a light scanner (a light scanner for horizontal scanning) of the image forming apparatus shown in FIG. 1, FIG. 7 is a graph showing a transition of a deflection angle of a movable plate of a light scanner (a light scanner for vertical scanning) of the image forming apparatus shown in FIG. 1, FIG. 8 is a graph showing a drive signal and an angle of the movable plate (a period in which the deflection angle is increased) of the light scanner for horizontal scanning of the image forming apparatus shown in FIG. 1, FIG. 9 is a graph showing a drive signal and an angle of the movable plate (a period in which the deflection angle is decreased) of the light scanner for horizontal scanning of the image forming apparatus shown in FIG. 1, FIG. 10 is a diagram for explanation of a first example of a method of determining a deflection width of a laser beam shown in FIG. 5 based on video data, FIG. 11 is a diagram for explanation of a second example of the method of determining the deflection width of the laser beam shown in FIG. 5 based on video data, and FIG. 12 shows a modified example of a display surface on which the drawable region, the drawing region, and the image shown in FIG. 5 are formed. Note that, as below, for convenience of explanation, the upside in FIGS. 2, 3A and 3B will be referred to as "up", the downside will be referred to as "down", the right side will be referred to as "right", and the left side will be referred to as "left".

An image forming apparatus 1 shown in FIG. 1 is an apparatus that displays predetermined images of still images, moving images (specifically, commercial, promotion videos), or the like on a display surface 91 provided on a surface of a display object 9 such as a floor, a wall, a ceiling, a screen or the like within a building, for example.

The display surface 91 as an object on which images are displayed may be a floor surface itself, a wall surface itself, or a ceiling surface itself, or a surface of a screen provided on the floor, the wall, or the ceiling. In the case where the surface of the screen is the display surface 91, an optical property suitable for image display may be provided to the display surface 91. Accordingly, visibility of an image may be improved regardless of materials of the location in which the image is displayed or the like. As a constituent material of the screen, not specifically limited, but, for example, polyethylene, polypropylene, polyvinyl chloride, polystyrene, polyamide, acrylic resin, ABS resin, fluorinated resin, epoxy resin, silicone resin, or copolymers, blends, polymer-alloys, and the like mainly containing them may be cited, and one or two of them may be used in combination.

As shown in FIG. 1, the image forming apparatus 1 includes a projector 2 that scans the display surface 91 with light to display an image (draw an image), and an actuation control device 5 that controls driving of the projector 2.

The image forming apparatus 1 displays an image using the light-scanning type projector 2, and thus, the apparatus is inexpensive and easy to be installed compared to an apparatus using a flat panel display such as an LED panel, a liquid crystal panel, or an organic EL panel.

As below, the respective parts forming the image forming apparatus 1 will sequentially be described in detail.

Projector

First, the projector 2 will be explained.

The projector 2 is adapted to scan a drawing region 911 formed on the display surface 91 with light to display an image.

Specifically, as shown in FIG. 1, the projector 2 includes a light source unit (light output unit) 3 that outputs light and a light scanning unit 4 that scans the display surface 91 with the light output from the light source unit 3. Light Source Unit (Light Output Unit)

As shown in FIG. 1, the light source unit 3 includes laser beam sources 31r, 31g, 31b of the respective colors, and collimator lenses 32r, 32g, 32b and dichroic mirrors 33r, 33g, 33b provided in correspondence with the laser beam sources 31r, 31g, 31b of the respective colors.

Further, the laser beam sources 31r, 31g, 31b of the respective colors have drive circuits 310r, 310g, 310b, a red light source 320r, a green light source 320g, a blue light source 320b, respectively (see FIG. 4), and output red, green, and blue laser beams RR, GG, BB as shown in FIG. 1. The laser beams RR, GG, BB are output in modulated states in response to drive signals transmitted from a light source modulation unit 54 of the actuation control device 5, which will be described later, and paralleled by the collimator lenses 32r, 32g, 32b as collimate optical devices into thin beams.

The dichroic mirrors 33r, 33g, 33b have characteristics of reflecting the red laser beam RR, the green laser beam GG, the blue laser beam BB, respectively, and couple the laser beams RR, GG, BB of the respective colors and output one laser beam (light) LL.

Note that, in place of the collimator lenses 32r, 32g, 32b, collimator mirrors may be used, and, in this case, a thin beam with parallel luminous flux may be formed. Further, when parallel luminous fluxes are output from the laser beam sources 31r, 31g, 31b of the respective colors, the collimator lenses 32r, 32g, 32b may be omitted. Furthermore, the laser beam sources 31r, 31g, 31b may be replaced by light sources such as light emitting diodes that generate the same luminous fluxes. In addition, the order of the laser beam sources 31r, 31g, 31b, the collimator lenses 32r, 32g, 32b, and the dichroic mirrors 33r, 33g, 33b of the respective colors in FIG. 1 is just an example, and the order may freely be set with the combinations of the respective colors (the laser beam source 31r, the collimator lens 32r, and the dichroic mirror 33r for red, the laser beam source 31g, the collimator lens 32g, and the dichroic mirror 33g for green, and the laser beam source 31b, the collimator lens 32b, and the dichroic mirror 33b for blue) held. For example, the combination of blue, red, green in the order closer to the light scanning unit 4 may be employed.

Since the light source unit 3 outputs the laser beams as described above, even when a deflection angle of a light reflection part 411e is changed, image blur may easily be prevented as will be described later. Further, the projector 2 using the light source unit 3 can perform close projection with free focus, and may adjust the projection position to an arbitrary position regardless of the installation position. Furthermore, by using laser beams, the optical systems including lenses for forming parallel light may be omitted or simplified, and downsizing of the light output unit and downsizing of the image forming apparatus 1 may be realized.

Light Scanning Unit

Next, the light scanning unit 4 will be explained.

The light scanning unit 4 performs two-dimensional scanning on the display surface 91 by performing scanning (horizontal scanning: main scanning) in a horizontal direction (a first direction) and performing scanning (vertical scanning: sub-scanning) in a vertical direction (a second direction orthogonal to the first direction) at a scanning speed (a second speed) lower than a horizontal scanning speed (a first speed) with a laser beam LL output from the light source unit 3.

The light scanning unit 4 has a light scanner (a first direction scanning part) 41 as a horizontal scanning mirror that scans the display surface 91 with the laser beam LL output from the light source unit 3 in the horizontal direction, an angle detecting unit (behavior detecting unit) 43 for detecting an angle (behavior) of a movable plate 411a, which will be described later, of the light scanner 41, a light scanner (a second direction scanning part) 42 as a vertical scanning mirror that scans the display surface 91 with the laser beam LL output from the light source unit 3 in the vertical direction, and an angle detecting unit (behavior detecting unit) 44 for detecting an angle (behavior) of a movable plate 421a, which will be described later, of the light scanner 42.

As below, the configurations of the light scanners 41, 42 will be explained, however, the light scanners 41, 42 have the same configuration as each other, and the light scanner 41 will be representatively explained and the explanation of the light scanner 42 will be omitted.

As shown in FIG. 2, the light scanner 41 is of the so-called single-degree-of-freedom system (one-dimensional scanning), and includes a base 411, an opposed substrate 413 provided to be opposed to the lower surface of the base 411, and a spacer member 412 provided between the base 411 and the opposed substrate 413.

The base 411 has the movable plate 411a, a support part 411b that rotatably supports the movable plate 411a, and a pair of connection parts 411c, 411d that connect the movable plate 411a and the support part 411b.

The movable plate 411a has a nearly rectangular shape in a plan view thereof. On the upper surface of the movable plate 411a, the light reflection part 411e (mirror) having light reflectivity is provided. The surface (upper surface) of the light reflection part 411e forms a reflection surface that reflects light. The light reflection part 411e is formed by a metal film of Al, Ni, or the like. Further, a permanent magnet 414 is provided on the lower surface of the movable plate 411a.

The support part 411b is provided to surround the outer periphery of the movable plate 411a in the plan view of the movable plate 411a. That is, the support part 411b has a frame shape and the movable plate 411a is located inside thereof.

The connection part 411c connects the movable plate 411a and the support part 411b at the left side of the movable plate

411a, and the connection part 411d connects the movable plate 411a and the support part 411b at the right side of the movable plate 411a.

The connection parts 411c, 411d respectively have longitudinal shapes. Further, the connection parts 411c, 411d are respectively elastically deformable. The pair of connection parts 411c, 411d are provided coaxially with each other, and the movable plate 411a rotates around the axis (hereinafter, referred to as "rotation center axis J1") relative to the support part 411b.

The base 411 is formed using silicon as a main material, for example, and the movable plate 411a and the support part 411b and the connection parts 411c, 411d are integrally formed. By using silicon as the main material, advantageous rotation characteristics may be realized, and advantageous durability may be exerted. Further, since microfabrication may be performed on silicon, by forming the base 411 using silicon as the main material, the dimension accuracy of the base 411 may be made advantageous and the vibration characteristics of the light scanner 41 may be made advantageous. Furthermore, downsizing of the light scanner 41 may be realized.

The spacer member 412 has a frame shape and its upper surface is bonded to the lower surface of the base 411. Further, the spacer member 412 has nearly the same shape as the shape of the support part 411b in the plan view of the movable plate 411a. The spacer member 412 is formed using various kinds of glass, various kinds of ceramics, silicon, $SiO_2$, or the like.

As a bonding method of the spacer member 412 and the base 411 is not particularly limited, but, for example, they may be bonded via a separate member of an adhesive agent or the like, or direct bonding or anodic bonding may be used depending on the constituent material of the spacer member 412.

The opposed substrate 413 is formed using various kinds of glass, silicon, $SiO_2$, or the like, like as the spacer member 412. A coil 415 is provided in a part opposed to the movable plate 411a on the upper surface of the opposed substrate 413.

The permanent magnet 414 has a bar shape and is provided along the lower surface of the movable plate 411a. The permanent magnet 414 is magnetized in a direction orthogonal to the rotation center axis J1 in the plan view of the movable plate 411a. That is, the permanent magnet 414 is provided so that a line segment connecting both poles (S-pole, N-pole) may be orthogonal to the rotation center axis J1.

As the permanent magnet 414, not particularly limited, but, for example, a neodymium magnet, a ferrite magnet, a samarium-cobalt magnet, an alnico magnet, or the like may be used.

The coil 415 is provided to surround the outer periphery of the permanent magnet 414 in the plan view of the movable plate 411a.

Further, the light scanner 41 has a voltage applying unit 416 for applying a voltage of the coil 415. The voltage applying unit 416 is adapted to adjust (change) respective conditions of voltage values, frequencies, etc. of the voltages to be applied. The voltage applying unit 416, the coil 415, and the permanent magnet 414 form a driving unit 417 for rotating the movable plate 411a.

To the coil 415, a predetermined voltage is applied from the voltage applying unit 416, and a predetermined current flows therein.

For example, when an alternating voltage is applied from the voltage applying unit 416 to the coil 415, in response, a current flows, a magnetic field in a thickness direction of the movable plate 411a (the vertical direction in FIG. 2) is generated, and the direction of the magnetic field is periodically switched. That is, state A in which the part around the upper side of the coil 415 is an S-pole and the part around the lower side is an N-pole and state B in which the part around the upper side of the coil 415 is an N-pole and the part around the lower side is an S-pole are alternately switched. For the purpose, the voltage applying unit 416 is drive-controlled by the actuation control device 5, which will be described later.

In state A, as shown in FIG. 3A, the part at the right side of the permanent magnet 414 is displaced upward by the repulsive force to the magnetic field generated through energization of the coil 415, and the part at the left side of the permanent magnet 414 is displaced downward by the attractive force to the magnetic field. Thereby, the movable plate 411a rotates counter-clockwise and tilts.

On the other hand, in state B, as shown in FIG. 3B, the part at the right side of the permanent magnet 414 is displaced downward, and the part at the left side of the permanent magnet 414 is displaced upward. Thereby, the movable plate 411a rotates clockwise and tilts.

By alternately repeating the state A and state B, the movable plate 411a rotates (vibrates) around the rotation center axis J1 while the connection parts 411c, 411d are torsionally deformed.

Further, by adjusting the voltage applied from the voltage applying unit 416 to the coil 415 through the control by the actuation control device 5, which will be described later, the flowing current may be adjusted, and thereby, the deflection angle (amplitude) of the rotation around the rotation center axis J1 of the movable plate 411a (the reflection surface of the light reflection part 411e) may be adjusted.

Note that the configuration of the light scanner 41 is not particularly limited as long as the movable plate 411a may be rotated, but, for example, the scanner may have a two-degree-of-freedom system. Further, the driving system of the light scanner 41 may be piezoelectric driving using a piezoelectric device, electrostatic driving using an electrostatic attractive force, or the like, for example, instead of the electromagnetic driving using the coil 415 and the permanent magnet 414.

As shown in FIG. 1, the light scanners 41, 42 having the above described configuration are provided so that the directions of their rotation center axes J1, J2 may be orthogonal to each other. By providing the light scanners 41, as described above, the display surface 91 may be two-dimensionally scanned (in two directions orthogonal to each other) with the laser beam LL output from the light source unit 3. Thereby, a two-dimensional image may be drawn on the display surface 91 using a relatively simple configuration.

Specifically, the light output from the light source unit 3 is reflected by the reflection surface of the light reflection part 411e of the light scanner 41, then, reflected by the reflection surface of the light reflection part 421e of the light scanner 42, and projected (radiated) on the display surface 91. Concurrently, the reflection part 411e of the light scanner 41 is rotated, and the light reflection part 421e of the light scanner 42 is rotated at an angular velocity lower than its angular velocity (velocity). Thereby, the display surface 91 is horizontally scanned with the laser beam LL output from the light source unit 3 and vertically scanned at a scanning speed lower than the scanning speed in the horizontal direction. In this manner, the display surface 91 is two-dimensionally scanned with the laser beam LL output from the light source unit 3, and an image is drawn on the display surface 91.

Here, in order to rotate the light reflection part 421e of the light scanner 42 at the lower angular velocity than the angular velocity of the light reflection part 411e of the light scanner 41, for example, the light scanner 41 may be resonantly driven using resonance and the light scanner 42 may be non-resonantly driven without using resonance. Further, in the case where both light scanners 41, 42 are resonantly driven, the light scanners 41, 42 may be designed so that the resonance frequency of the light scanner 41 (the resonance frequency of a vibration system including the movable plate 411*a* and the connection parts 411*c*, 411*d*) may be higher than the resonance frequency of the light scanner 42.

Note that the light output from the light source unit 3 may be first reflected by the light reflection part 421*e* of the light scanner 42, and then, reflected by the light reflection part 411*e* of the light scanner 41. That is, vertical scanning may be first performed, and then, horizontal scanning may be performed.

Next, the angle detecting unit 43 for detecting the angle of the movable plate 411*a* of the light scanner 41 will be explained. Note that the angle detecting unit 44 for detecting the angle of the movable plate 421*a* of the light scanner 42 has the same configuration as that of the angle detecting unit 43, and its explanation will be omitted.

As shown in FIG. 2, the angle detecting unit 43 has a piezoelectric device 431 provided on the connection part 411*c* of the light scanner 41, an electromotive force detecting unit 432 that detects an electromotive force generated from the piezoelectric device 431, and an angle sensing unit 433 that obtains the angle (senses the behavior) of the movable plate 411*a* based on the detection result of the electromotive force detecting unit 432.

When the connection part 411*c* torsionally deforms with the rotation of the movable plate 411*a*, the piezoelectric device 431 deforms with the deformation. Since the piezoelectric device 431 has a nature, when deforming from the natural state with no application of an external force, of generating an electromotive force having a magnitude in response to the amount of deformation (in other words, a nature of changing its resistance value in response to the amount deformation), the angle sensing unit 433 obtains the degree of torsion of the connection part 411*c* based on the magnitude of the electromotive force (or the resistance value) detected by the electromotive force detecting unit 432, and further, obtains the angle (of the reflection surface of the light reflection part 411*e*) of the movable plate 411*a* from the degree of torsion. Furthermore, the angle sensing unit 433 obtains the deflection angle (the maximum deflection angle) around the rotation center axis J1 of the movable plate 411*a*. The signal containing information on the angle and the deflection angle of the movable plate 411*a* is transmitted from the angle sensing unit 433 to the actuation control device 5.

Note that the reference of the angle (0°) of the movable plate 411*a* to be detected may be set in any state of the light scanner 41, for example, it may be set when the light scanner 41 is in the initial state (no voltage is applied to the coil 415).

Further, the detection of the angle of the movable plate 411*a* may be performed in real time (continuously), or intermittently. Furthermore, as the angle detecting unit 43, not limited to means using the piezoelectric device as in the embodiment, but any means that may detect the angle of the movable plate 411*a*, for example, an optical sensor may be used.

Actuation Control Device

The actuation control device 5 will be explained.

As shown in FIG. 4, the actuation control device 5 has a video data storage unit 51 that stores video data (image data) used when images are drawn, a video data computation unit 52, a drawing timing generation unit 53, the light source modulation unit (light modulation unit) 54, a deflection angle computation unit (amplitude computation unit) 55, and an angle instruction unit 56.

Specifically, the actuation control device 5 forms a changing unit (angle control unit) that changes the length in the horizontal direction of the image displayed on the display surface 91 by changing the deflection angle of the light reflection part 411*e* of the movable plate 411*a* for scanning in the horizontal direction (first direction).

In the control of the projector 2 by the actuation control device 5, first, video data is input to the projector 2. The input video data is temporarily stored in the video data storage unit 51, and image drawing is performed using the video data read out from the video data storage unit 51. In this case, image drawing may be started after all of the video data are stored in the video data storage unit 51, or image drawing may be started after a part of the video data is stored in the video data storage unit 51 and the subsequent video data may be stored in the video data storage unit 51 in parallel to the image drawing.

In the case where image drawing is started after a part of the video data is stored in the video data storage unit 51, first, at least video data for one frame is stored in the video data storage unit 51, and then, image drawing is started.

In the drawing timing generation unit 53, drawing timing information and drawing line information are respectively generated. The drawing timing information is sent out to the video data computation unit 52, and the drawing line information is sent out to the deflection angle computation unit 55 and the angle instruction unit 56.

The drawing timing information includes information on drawing timing (output timing of light with respect to each pixel) etc. Further, the drawing line information includes information on a position of a drawing line L for drawing in the vertical direction (a target angle of the movable plate 421*a*), information on the length of the drawing line L (a target angle of the movable plate 411*a*), etc. Note that the position of any part of the drawing line L may be set as the vertical position of the drawing line L, and, for example, the left end, the right end, the center, or the like may be used.

Further, the drawing line information is changed based on the video data, as will be described later. Furthermore, the drawing timing information is also changed with the change of the drawing line information.

The video data computation unit 52 reads out the video data corresponding to the pixels to be drawn from the video data storage unit 51 and performs various correction computations and the like based on the drawing timing information input from the drawing timing generation unit 53, and then, sends out brightness data of the respective colors to the light source modulation unit 54.

The light source modulation unit 54 performs modulation of the respective light sources 320*r*, 320*g*, 320*b* via the respective drive circuits 310*r*, 310*g*, 310*b* based on the brightness data of the respective colors input from the video data computation unit 52. That is, the unit performs turning on/off, adjustment (increase and decrease) of the outputs, etc. of the respective light sources 320*r*, 320*g*, 320*b*. Thereby, the light source unit 3 sequentially outputs the light corresponding to each pixel of the video data (image information) with each predetermined timing.

The angle detecting unit 43 at the light scanner 41 side detects the angle and the deflection angle of the movable plate 411*a*, and sends out the information on the angle and the deflection angle (the angle information of the movable plate 411*a*) to the drawing timing generation unit 53 and the deflection angle computation unit 55 of the actuation control device 5. Further, the angle detecting unit 44 at the light scanner 42 detects the angle of the movable plate 421*a*, and sends out the information of the angle (the angle information of the movable plate 421a) to the angle instruction unit 56 of the actuation control device 5.

When the drawing of the current drawing line L ends and the information on the deflection angle of the movable plate 411a is input from the angle detecting unit 43, in synchronization, the drawing timing generation unit 53 sends out the target angle information (angle instruction) showing the target angle of the movable plate 421a when the laser beam LL is radiated to the drawing start point of the drawing line L to be drawn next to the angle instruction unit 56. The target angle of the movable plate 421a is set so that the pitch of the drawing line (the distance between the drawing line Ln and the drawing line Ln−1 in the vertical direction), which will be described later, may be constant. The angle instruction unit 56 compares the angle of the movable plate 421a detected by the angle detecting unit 44 and the target angle of the movable plate 421a, performs correction to make the difference zero, and sends out drive data to a driving unit 427 of the light scanner 42.

The driving unit 427 drives the light scanner 42 (applies a voltage to the coil) based on the drive data. Thereby, when the laser beam LL is radiated to the drawing start point, the angle of the movable plate 421a becomes the target angle.

Note that, in the embodiment, the angular velocity of the movable plate 421a is set constant and the scanning speed of the laser beam LL in the vertical direction is set constant from the drawing start point to the drawing end point in each drawing line L, however, the angular velocity of the movable plate 421a may gradually be changed and the scanning speed of the laser beam LL in the vertical direction may gradually be changed.

Further, the drawing timing generation unit 53 sends out the drawing line information, i.e., the information on the position in the vertical direction of the drawing line L to be drawn next and the length information of the drawing line L to the deflection angle computation unit 55.

In the deflection angle computation unit 55, the target deflection angle (the target value of the deflection angle) of the movable plate 411a on the drawing line L to be drawn next is obtained based on the information on the position in the vertical direction of the drawing line L to be drawn next and the length information of the drawing line L input from the drawing timing generation unit 53.

Then, the drive data is sent out to the driving unit 417 of the light scanner 41 based on the information on the deflection angle of the movable plate 411a input from the angle detecting unit 43 and the target deflection angle of the movable plate 411a so that the deflection angle of the movable plate 411a may be the target deflection angle.

The driving unit 417 applies an effective voltage at the same frequency as the resonance frequency of the light scanner 41 to the coil 415 based on the drive data to allow a current to flow, generate a predetermined magnetic field, and change the magnitude of the effective current and the phase difference between the light scanner 41 and the drive waveform, and thereby, supplies energy to the light scanner 41 and, contrary, drains the light scanner 41 of energy. Thereby, the deflection angle of the movable plate 411a in resonance motion becomes the target deflection angle. In this manner, the respective drawing lines L in the drawing region 911 are sequentially scanned with the laser beam LL and an image is drawn while the deflection angle of the movable plate 411a is adjusted based on the information (detection result) on the deflection angle of the movable plate 411a detected by the angle detecting unit 43 and the target deflection angle (target value) so that the deflection angle of the movable plate 411a may be the target deflection angle.

As described above, the actuation control device 5 adjusts the magnitude and the frequency of the current or the voltage generated by the voltage applying unit 416 of the driving unit 417 to change the deflection angle of the light reflection part 411e for horizontal scanning. Thereby, the deflection angle of the light reflection part 411e may be changed relatively easily and reliably.

For example, as shown in FIG. 5, the plural drawing lines (scanning lines) L as trajectories of the laser beam LL on the display surface 91 are arranged in a zigzag manner.

Specifically, drawing is started from the upper left of the drawing region 911, drawing is performed to the lower right in a zigzag manner, and the drawing in one frame ends. Further, drawing is performed in the same manner with respect to the subsequent respective frames.

As described above, the light scanning unit 4 performs two-dimensional scanning by performing scanning at plural times in the horizontal direction while performing scanning in the direction once to form an image for one frame on the display surface 91. By repeating the operation, images for plural frames are sequentially formed on the display surface 91.

The plural drawing lines L are trajectories of the laser beam LL on the display surface 91 when the two-dimensional scanning is performed with the laser beam LL in the light output state in which the laser beam LL is output from the light source unit 3 (hereinafter, also simply referred to as "light output state").

As shown in FIG. 5, a drawable region 912 formed by the plural drawing lines L on the display surface 91 has parts 912a, 912c in which the lengths in the horizontal direction (first direction) (hereinafter, also referred to as "width of the drawable region 912") increase and parts 912b, 912d in which the lengths decrease from the upper side (a first side) toward the lower side (a second side) in the vertical direction (second direction).

In other words, the drawable region 912 has the parts 912a, 912c in which the lengths of the drawing lines L increase from the upper side toward the lower side and the parts 912b, 912d in which the lengths of the drawing lines L decrease from the upper side toward the lower side.

Further, the part 912a, the part 912b, the part 912c, the part 912d are arranged in juxtaposition from the upper side to the lower side in this order.

Thereby, as shown in FIG. 5, for example, even when an image g has an outer shape formed by vertically combining two circular shapes, the area of the region in which the image g is not formed of the drawable region 912 where drawing can be performed may be made smaller. Further, for example, even when the outer shape of the display surface 91 is a rhombic shape having diagonal lines along the horizontal direction and the vertical direction (see FIG. 12), or a circular shape, an ellipsoidal shape, or the like, the area of the part off-screen of the display surface 91 of the drawable region 912 and the area of the part not the drawable region 912 of the region of the display surface 91 may be made smaller. As a result, images may be displayed by efficient scanning with light.

In the drawable region 912, the lengths of the plural drawing lines L change from the upper side toward the lower side. That is, the deflection width of the laser beam LL in the horizontal direction on the display surface 91 in the light output state (hereinafter, simply referred to as "deflection width of the laser beam (light) LL") may change from the upper side toward the lower side.

Note that the deflection width of the laser beam LL is the distance between the position of the laser beam LL in the same plane as the display surface 91 when the movable plate 411a rotates to the maximum angle clockwise (in a predetermined direction) in FIG. 3B and the position of the laser beam LL in the same plane as the display surface 91 when the movable plate 411a subsequently rotates to the maximum angle counter-clockwise (in the opposite direction to that direction) in FIG. 3A in the light output state. That is, the deflection width of the laser beam LL is the lengths in the horizontal direction of the plural drawing lines (scanning lines) L as shown in FIG. 5.

The length of the drawing line L may be changed by changing the deflection angle around the rotation center axis J1 of the movable plate 411a (hereinafter, also simply referred to as "deflection angle of the movable plate 411a").

Accordingly, the actuation control device 5 changes the length of the image to be displayed on the display surface 91 in the horizontal direction by changing the deflection angle of the movable plate 411a, i.e., the deflection angle of the light reflection part 411e of the movable plate 411a.

Specifically, the actuation control device 5 changes the deflection angle of the light reflection part 411e for horizontal scanning in combination of periods $T_1$, $T_3$ for increasing it and periods $T_2$, $T_4$ for decreasing it while the light reflection part 421e for vertical scanning performs scanning with the laser beam LL once.

Specifically, the actuation control device 5 changes the deflection angle of the light reflection part 411e by combining the period $T_1$ for increasing the deflection angle of the light reflection part 411e, the period $T_2$ for decreasing the deflection angle of the light reflection part 411e, the period $T_3$ for increasing the deflection angle of the light reflection part 411e, and the period $T_4$ for decreasing the deflection angle of the light reflection part 411e in this order within one frame.

Thereby, the drawable region 912 having the above described shape may be formed.

More specifically, in the embodiment, the actuation control device 5 changes the deflection angle of the light reflection part 411e for horizontal scanning based on the image information containing the information on the shape of the image g to be displayed on the display surface 91. Thereby, the area of the region in which the image g is not formed of the drawable region 912 in which drawing can be performed (the region between the outer peripheral edge of the drawable region 912 and the outer peripheral edge of the image g) may be made smaller.

In the embodiment, in the actuation control device 5, the drawing timing generation unit 53 changes the drawing line information, the drawing timing information, etc. based on the video data stored in the video data storage unit 51.

Specifically, the actuation control device 5 changes the deflection angle of the light reflection part 411e for horizontal scanning so that the outer shape of the drawable region 912 may correspond to the outer shape of the image g to be displayed on the display surface 91. In the embodiment, the deflection angle of the light reflection part 411e is changed so that the outer shape of the drawable region 912 may be the same (nearly the same) as the outer shape of the image g to be displayed on the display surface 91. Thereby, the area of the region with no image formed of the drawable region 912 in which drawing can be performed may easily and reliably be made smaller.

Note that, in the embodiment, as will be described later, the outer shape of the drawable region 912 is formed slightly larger than the outer shape of the image g to be displayed on the display surface 91. That is, the area of the region with no image g formed of the drawable region 912 is slightly formed between the outer peripheral edge of the drawable region 912 and the outer peripheral edge of the image g. Thereby, the angular velocity (velocity) of the light reflection part 411e of the light scanner 41 is small, and drawing may be performed without using the left end portions and the right end portions of the respective drawing lines L unsuitable for drawing. Accordingly, a high-definition image may easily be displayed.

Here, the deflection angles of the light reflection part 411e and the light reflection part 421e will be described in detail.

The horizontal scanning is performed at plural times within each frame as described above. In the case where the deflection angle of the light reflection part 411e for horizontal scanning is not adjusted based on the outer shape of the image g as described above, as shown in FIG. 6, the deflection angle of the light reflection part 411e, i.e., the deflection angle $\theta_1$ of the movable plate 411a is fixed. Note that, here, "deflection angle $\theta_1$ of the movable plate 411a" refers to an angle (the maximum deflection angle) formed by the movable plate 411a that has rotated to the maximum angle ($\theta_1/2$) clockwise (in one direction) in FIG. 3B and the movable plate 411a that has rotated to the maximum angle ($\theta_1/2$) counter-clockwise (in the other direction) in FIG. 3A (the reference is the same hereinafter).

Further, the vertical scanning is performed once within each frame as described above, and the deflection angle of the light reflection part 421e, i.e., the deflection angle $\theta_2$ (the maximum deflection angle) of the movable plate 421a is fixed. More specifically, as shown in FIG. 7, the angle $\theta_2$ of the movable plate 421a gradually increases from the minimum deflection angle in the display period for image display, reaches the maximum deflection angle, and then, rapidly decreases within one frame. Then, in the subsequent respective frames, similarly, the operation is repeated. Note that FIG. 7 shows the transition of the rotation angle of the movable plate 421a between the movable plate 421a that has rotated to the maximum angle (the minimum deflection angle) in one direction and the plate that has rotated to the minimum angle (the maximum deflection angle) in the other direction within the respective frames. Further, the period in which the deflection angle $\theta_2$ of the movable plate 421a rapidly decreases as described above is referred to as "vertical blanking period". The vertical blanking period is set near between two adjacent frames.

In the periods $T_1$, $T_3$ in which the deflection angle of the light reflection part 411e is increased as described above, as shown in FIG. 8, the deflection angle of the movable plate 411a is gradually increased, respectively, and the deflection width of the laser beam LL (i.e., the length of the drawing line L) in the output state is made longer from the upper side toward the lower side.

On the other hand, in the periods $T_2$, $T_4$ in which the deflection angle of the light reflection part 411e is decreased as described above, as shown in FIG. 9, the deflection angle of the movable plate 411a is gradually decreased, respectively, and the deflection width of the laser beam LL (i.e., the length of the drawing line L) in the output state is made shorter from the lower side toward the upper side.

The change (increase or decrease) of the deflection angle of the movable plate 411a is performed by adjusting the magnitude and the frequency of the drive signal (current or voltage) generated by the voltage applying unit 416 of the driving unit 417.

Specifically, in the case where the deflection angle of the movable plate 411a is gradually increased, the magnitude and the frequency of the drive signal are respectively gradually increased as shown in FIG. 8.

In this regard, the magnitude of the drive signal is changed first and the frequency of the drive signal is changed next. Thereby, the deflection angle of the movable plate 411a may be increased while the resonance state of the movable plate 411a is kept.

On the other hand, in the case where the deflection angle of the movable plate 411a is gradually decreased, the magnitude and the frequency of the drive signal are respectively gradually decreased as shown in FIG. 9.

In this regard, the frequency of the drive signal is changed first and the magnitude of the drive signal is changed next. Thereby, the deflection angle of the movable plate 411a may be decreased while the resonance state of the movable plate 411a is kept.

Here, the time when one of the magnitude of the drive signal and the frequency of the drive signal (to be changed first) and the time when the other of them (to be changed next) after the one has been changed are not particularly limited, respectively, but may appropriately be set according to various conditions.

In the embodiment, the time when the one is changed is set to the time when the movable plate 411a rotates to the maximum in a predetermined direction.

Further, the time when the other is changed is determined based on the detection result of the angle detecting unit 43 and the frequency of the drive signal. That is, the deflection angle of the movable plate 411a is estimated based on the detection result of the angle detecting unit 43 and the frequency of the drive signal, and the time when the estimate value of the deflection angle and the target value of the deflection angle are the same is determined as the time when the other is changed. Note that, when the estimate value of the deflection angle and the target value of the deflection angle are not the same, the other is not changed. The estimation of the deflection angle of the movable plate 411a and the determination as to whether the estimate value of the deflection angle and the target value of the deflection angle are the same or not are respectively performed by the deflection angle computation unit 55.

Note that the frequency (period) of the drive signal used for estimation of the deflection angle is, if the frequency of the drive signal is changed first, the changed frequency, and, if the frequency of the drive signal is changed next, the frequency to be changed. Further, the drive signal may be changed with respect to each line or plural lines.

The target value of the deflection angle of the movable plate 411a is determined based on the video data stored in the video data storage unit 51.

Specifically, as described above, the drawing timing generation unit 53 generates length information of the drawing lines L based on the video data stored in the video data storage unit 51, and the deflection angle computation unit 55 determines the target deflection angle (the target value of the deflection angle) of the movable plate 411a based on the length information of the drawing lines L.

In this regard, the drawing timing generation unit 53 determines the outer shape of the image g to be displayed on the display surface 91 and obtains the lengths of the respective drawing lines L.

As below, regarding the calculation methods of the lengths of the drawing lines L in the drawing timing generation unit 53, a first example and a second example will representatively be explained.

First Example

As shown in FIG. 10, when video data D is displayed ((X,Y) coordinates are set) on a virtual screen, plural line segments LD arranged in the longitudinal direction (the vertical direction in FIG. 10) nearly in parallel to the lateral direction (horizontal direction in FIG. 10) are set with respect to the video data D.

The plural line segments LD include n line segments provided in the order of LD1, LD2, . . . , LDn−1, LDn from the upper side toward the lower side in FIG. 10, and arranged in a zigzag manner from the upper left corner to the lower right corner of the video data D. The plural line segments LD correspond to the plural drawing lines L when the above described adjustment is not performed. Further, in the embodiment, the video data D has a rectangular shape when displayed on the virtual screen as described above, and the lengths a of the plural line segments LD are the same as one another.

Further, the drawing timing generation unit 53 obtains two intersections between the respective line segments LD and the contour (outer peripheral edge) of the image Dg of the video data D, and determines the lengths of the respective drawing lines L based on the distances between the two intersections.

Specifically, for example, when two intersections (XS1, YS1) and (XE1,YE1) between the line segment LD1 and the contour (outer peripheral edge) of the image Dg of the video data D are obtained, whether the brightness information of the video data D on the line segment LD1 is equal to or more than a predetermined value or not (for example, more than zero or not) is determined sequentially from the left end. Then, the coordinates at which the brightness information is first equal to or more than the predetermined value is set to (XS1,YS1). Further, whether the brightness information of the video data D on the line segment LD1 is equal to or more than a predetermined value or not (for example, more than zero or not) is determined sequentially from the right end. Then, the coordinates at which the brightness information is first equal to or more than the predetermined value is set to (XE1,YE1).

A distance a1 between thus obtained coordinates (XS1, YS1) and (XE1,YE1) is obtained.

The distance a1 may be obtained using the following equation (1).

$$a1 = \sqrt{((XS1-XE1)^2 + (YS1-YE1)^2)} \qquad (1)$$

Further, the length A1 of the drawing line L1 corresponding to the line segment LD1 may be obtained using the following equation (2).

$$A1 = A \times a1/a + \alpha \qquad (2)$$

Here, A is the length of the drawing line L when the deflection width of the laser beam LL is not adjusted (fixed), and α is a value (constant) corresponding to the width of the region in which the image g is not formed of the above described drawable region 912 (the length in the horizontal direction).

Subsequently, regarding the LD2, . . . , LDn−1, LDn, the lengths of the drawing lines L2, . . . , Ln−1, Ln are obtained in the same manner, respectively.

In this manner, the length of the drawing line L1 corresponding to the outer shape of the image g may be obtained.

Second Example

As shown in FIG. 11, as is the case of the above described first example, when video data D is displayed ((X,Y) coordinates are set) on a virtual screen, plural line segments LD arranged in the longitudinal direction (the vertical direction in FIG. 11) nearly in parallel to the lateral direction (horizontal direction in FIG. 11) are set with respect to the video data D.

Further, the drawing timing generation unit 53 obtains two intersections between the respective line segments LD and the contour (outer peripheral edge) of the image Dg of the video data D, and determines the lengths of the respective drawing lines L based on the distances between the two intersections and the center line of the video data D.

Specifically, for example, two intersections (XS1,YS1) and (XE1,YE1) between the line segment LD1 and the contour (outer peripheral edge) of the image Dg of the video data D are obtained as is the case of the above described first example.

Further, a distance b1 between the center line passing through the center in the X-direction and extended in the Y-axis direction of the video data D on the virtual screen and the coordinates (XS1, YS1) and a distance c1 between the center line and the coordinates (XE1,YE1) are obtained.

The obtained distance b1 and distance c1 are compared, and the longer distance of the distance b1 and the distance c1 is doubled and the distance a1 is obtained.

Then, as is the case of the above described first example, the length A1 of the drawing line L1 corresponding to the line segment LD1 is obtained using the above equation (2).

Subsequently, regarding the LD2, . . . , LDn−1, LDn, the lengths of the drawing lines L2, . . . , Ln−1, Ln are obtained in the same manner, respectively.

In this manner, the length of the drawing line L1 corresponding to the outer shape of the image g may be obtained. In the second example, when the image Dg is symmetric on the virtual screen, the same result as that of the above described first example is obtained, however, even when the image Dg is asymmetric on the virtual screen, unlike the above described first example, also the drawable region 912 is symmetric. Accordingly, there is an advantage that control of the light scanner 41 as described above is easy.

According to the above described image forming apparatus 1 according to the first embodiment, since the parts 912a, 912c in which the width of the drawable region 912 has increased and the parts 912b, 912d in which the width has decreased from the upper side (a first side) toward the lower side (a second side) in the vertical direction (second direction) are provided, even when the outer shape of the image g is the shape formed by vertically combining two circular shapes, the area of the region in which the image g is not formed of the drawable region 912 where drawing can be performed may be made smaller. Further, for example, if the outer shape of the display surface 91 is a rhombic shape having diagonal lines along the horizontal direction and the vertical direction (see FIG. 12), or a circular shape, an ellipsoidal shape, or the like, the area of the part off-screen of the display surface 91 of the drawable region 912 and the area of the part not the drawable region 912 of the region of the display surface 91 may be made smaller. As a result, images may be displayed by efficient scanning with light.

Second Embodiment

Next, a second embodiment of the image forming apparatus of the invention will be explained.

Figure 13:
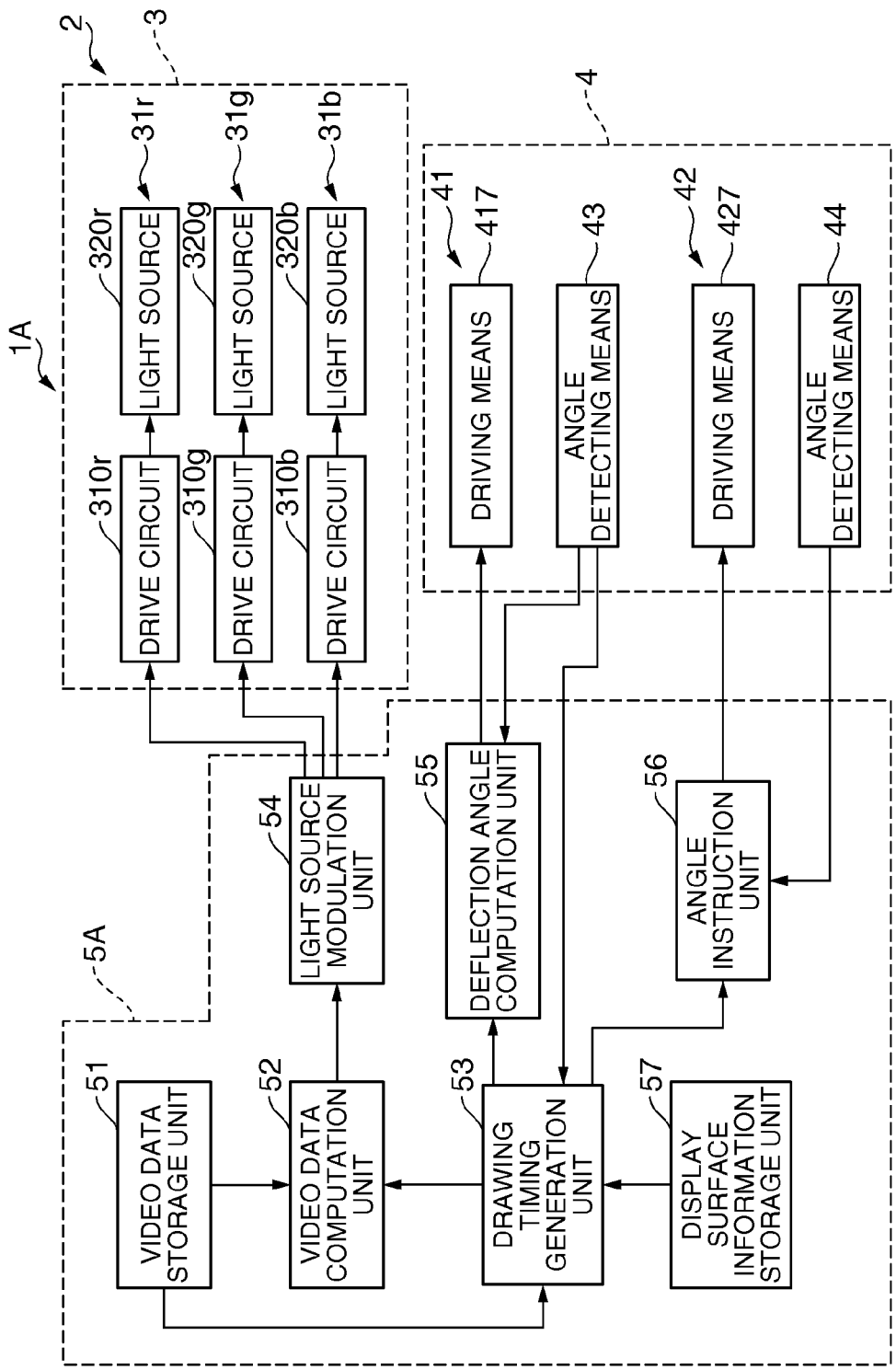
FIG. 13 is a block diagram showing a control system (an actuation control device, a light scanning unit, and a light source unit) of an image forming apparatus according to the second embodiment of the invention.
Figure 14:
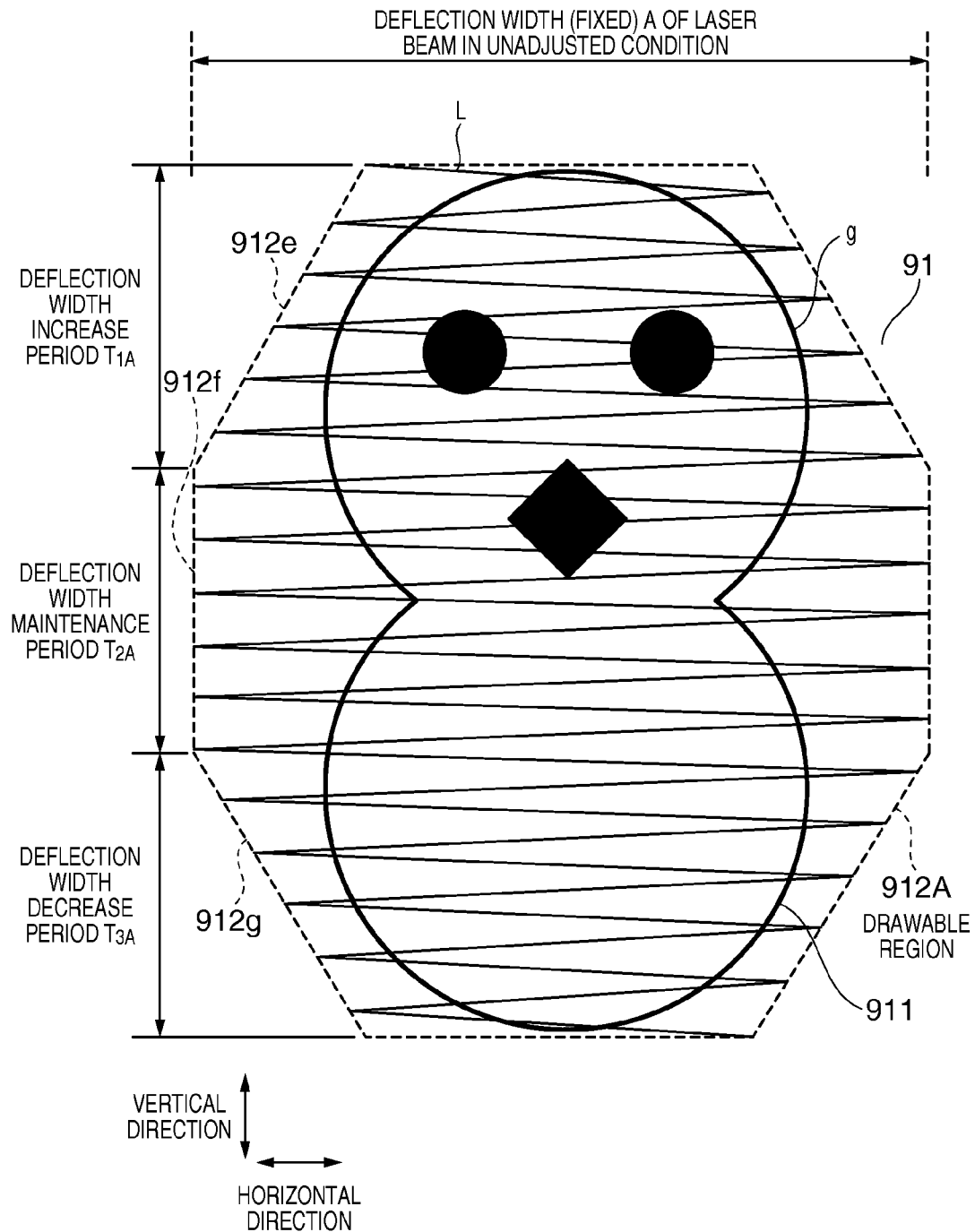
FIG. 14 is a diagram for explanation of a first example of an operation of the image forming apparatus shown in FIG. 13 (a diagram for explanation of a drawable region, a drawing region, and an image).
Figure 15:
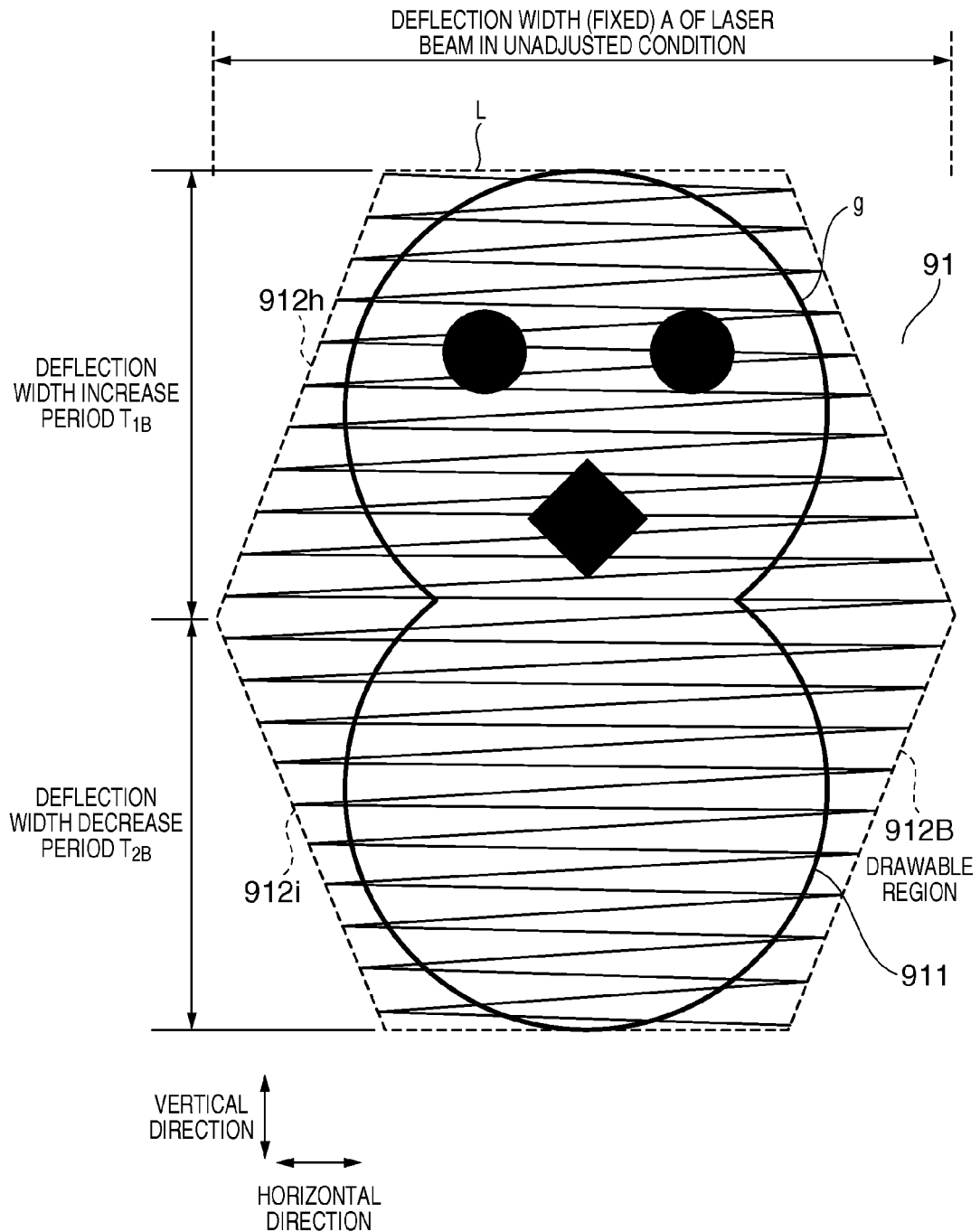
FIG. 15 is a diagram for explanation of a second example of the operation of the image forming apparatus shown in FIG. 13 (a diagram for explanation of the drawable region, the drawing region, and the image).

FIG. 13 is a block diagram showing a control system (an actuation control device, alight scanning unit, and a light source unit) of an image forming apparatus according to the second embodiment of the invention, FIG. 14 is a diagram for explanation of a first example of an operation of the image forming apparatus shown in FIG. 13 (a diagram for explanation of a drawable region, a drawing region, and an image), and FIG. 15 is a diagram for explanation of a second example of the operation of the image forming apparatus shown in FIG. 13 (a diagram for explanation of the drawable region, the drawing region, and the image). Note that, as below, for convenience of explanation, the upside in FIG. 13 will be referred to as "up", the downside will be referred to as "down", the right side will be referred to as "right", and the left side will be referred to as "left".

As below, the image forming apparatus of the second embodiment will be explained by centering on the differences from the above described first embodiment, and the explanation of the same matter will be omitted.

The image forming apparatus of the second embodiment is nearly the same as that of the first embodiment except that the shape of the drawable region and the changing method of the deflection angle of the movable plate 411a are different. In FIG. 13, the same signs are assigned to the same elements as those of the above described embodiment.

As shown in FIG. 13, the image forming apparatus 1A of the embodiment includes the projector 2 and an actuation control device 5A that controls driving of the projector 2.

The actuation control device 5A has a display surface information storage unit 57 that stores display information on the shape of a display object having the display screen 91.

In the actuation control device 5A, the drawing timing generation unit 53 is adapted to change (adjust) the drawing line information and the drawing timing information based on the video data stored in the video data storage unit 51 and the display surface information stored in the display surface information storage unit 57.

That is, the actuation control device 5A changes the deflection angle of the light reflection part 411e for horizontal scanning based on the display surface information containing the information on the shape of the display object having the display surface 91. Thereby, the area of the part off-screen of the display surface of a drawable region 912A and the area of the part not the drawable region of the region of the display surface 91 may be made smaller.

As below, a first example and a second example of an operation of the actuation control device 5A will be explained.

First Example

As shown in FIG. 14, in the first example, the drawable region 912A is formed by plural drawing lines L on the display screen 91.

Further, the drawable region 912A has a part 912e in which the width of the drawable region 912A increases from the upper side (a first side) toward the lower side (a second side) in the vertical direction, apart 912f in which the width is constant, and a part 912g in which the width decreases.

In other words, the drawable region 912A has the part 912e in which the lengths of the drawing lines L increase from the upper side toward the lower side, the part 912f in which the lengths of the drawing lines L are maintained constant from the upper side toward the lower side, and the part 912g in which the lengths of the drawing lines L decrease from the upper side toward the lower side.

Further, the part 912e, the part 912f, the part 912g are arranged in juxtaposition from the upper side to the lower side in this order.

Thereby, as shown in FIG. 14, for example, even when an image g has an outer shape formed by vertically combining two circular shapes, the area of the region in which the image g is not formed of the drawable region 912A where drawing can be performed may be made smaller. Further, for example, even when the outer shape of the display surface 91 is a rhombic shape having diagonal lines along the horizontal direction and the vertical direction (see FIG. 12 of the above described first embodiment), or a circular shape, an ellipsoidal shape, or the like, the area of the part off-screen of the display surface 91 of the drawable region 912A and the area of the part not the drawable region 912A of the region of the display surface 91 may be made smaller. As a result, images may be displayed by efficient scanning with light.

In the first example, the actuation control device 5A changes the deflection angle of the light reflection part 411e for horizontal scanning in combination of a period $T_{1A}$ for increasing, a period $T_{2A}$ for maintaining it constant, a period $T_{3A}$ for decreasing it while the light reflection part 421e for vertical scanning performs scanning of the laser beam LL once.

Specifically, the actuation control device 5A changes the deflection angle of the light reflection part 411e by combining the period $T_{1A}$ for increasing the deflection angle of the light reflection part 411e, the period $T_{2A}$ for maintaining the deflection angle of the light reflection part 411e constant, and the period $T_{3A}$ for decreasing the deflection angle of the light reflection part 411e in this order within one frame.

Thereby, the drawable region 912A having the above described shape may be formed.

In the first example, in the period $T_{1A}$ in which the deflection angle of the light reflection part 411e is increased, the deflection angle of the light reflection part 411e increases at a constant change rate. Further, in the period $T_{3A}$ in which the deflection angle of the light reflection part 411e is decreased, the deflection angle of the light reflection part 411e decreases at a constant change rate.

Thereby, while the change of the deflection angle of the light reflection part 411e is easy, the outer shape of the drawable region 912A may be conformed to the outer shape of the image g and the outer shape of the display surface 91.

The target value of the deflection angle of the movable plate 411a is determined based on the video data stored in the video data storage unit 51 and the display surface information stored in the display surface information storage unit 57.

For example, the video data stored in the video data storage unit 51 and the display surface information stored in the display surface information storage unit 57 are compared (shapes and sizes are compared), apart at the farthest distance between the outer peripheral edge of the image and the outer peripheral edge of the display surface is obtained, and the deflection angle of the light reflection part 411e is changed in a range except a predetermined range in the vertical direction containing the part. In this regard, the change rate of the deflection angle of the light reflection part 411e is determined based on the video data stored in the video data storage unit 51.

Second Example

As shown in FIG. 15, in the second example, a drawable region 912B is formed by plural drawing lines L on the display screen 91.

Further, the drawable region 912B has a part 912h in which the width of the drawable region 912B increases from the upper side (a first side) toward the lower side (a second side) in the vertical direction and a part 912i in which the width decreases.

In other words, the drawable region 912B has the part 912h in which the lengths of the drawing lines L increase from the upper side toward the lower side, and the part 912i in which the lengths of the drawing lines L decrease from the upper side toward the lower side.

Further, the part 912h, the part 912i are arranged in juxtaposition from the upper side to the lower side in this order.

Thereby, as shown in FIG. 15, for example, even when an image g has an outer shape formed by vertically combining two circular shapes, the area of the region in which the image g is not formed of the drawable region 912B where drawing can be performed may be made smaller. Further, for example, even when the outer shape of the display surface 91 is a rhombic shape having diagonal lines along the horizontal direction and the vertical direction (see FIG. 12 of the above described first embodiment), or a circular shape, an ellipsoidal shape, or the like, the area of the part off-screen of the display surface 91 of the drawable region 912B and the area of the part not the drawable region 912B of the region of the display surface 91 may be made smaller. As a result, images may be displayed by efficient scanning with light.

In the second example, the actuation control device 5A changes the deflection angle of the light reflection part 411e for horizontal scanning in combination of a period $T_{1B}$ for increasing and a period $T_{2B}$ for decreasing it while the light reflection part 421e for vertical scanning performs scanning of the laser beam LL once.

Specifically, the actuation control device 5A changes the deflection angle of the light reflection part 411e by combining the period $T_{1B}$ for increasing the deflection angle of the light reflection part 411e and the period $T_{2B}$ for decreasing the deflection angle of the light reflection part 411e in this order within one frame.

Thereby, the drawable region 912B having the above described shape may be formed.

In the second example, in the period $T_{1B}$ in which the deflection angle of the light reflection part 411e is increased, the deflection angle of the light reflection part 411e increases at a constant change rate. Further, in the period $T_{2B}$ in which the deflection angle of the light reflection part 411e is decreased, the deflection angle of the light reflection part 411e decreases at a constant change rate.

Thereby, while the change of the deflection angle of the light reflection part 411e is easy, the outer shape of the drawable region 912B may be conformed to the outer shape of the image g and the outer shape of the display surface 91.

The target value of the deflection angle of the movable plate 411a is determined based on the video data stored in the video data storage unit 51 and the display surface information stored in the display surface information storage unit 57.

For example, the video data stored in the video data storage unit 51 and the display surface information stored in the display surface information storage unit 57 are compared (shapes and sizes are compared), a part at the farthest distance between the outer peripheral edge of the image and the outer peripheral edge of the display surface in the horizontal direction (the center in the vertical direction in the embodiment) is obtained, and the deflection angle of the light reflection part 411e is changed with reference to the part. In this regard, the change rate of the deflection angle of the light reflection part 411e is determined based on the video data stored in the video data storage unit 51.

Using the above described image forming apparatus according to the second embodiment, the same effect as that of the above described first embodiment may be exerted.

Third Embodiment

Next, a third embodiment of the image forming apparatus of the invention will be explained.

Figure 16:
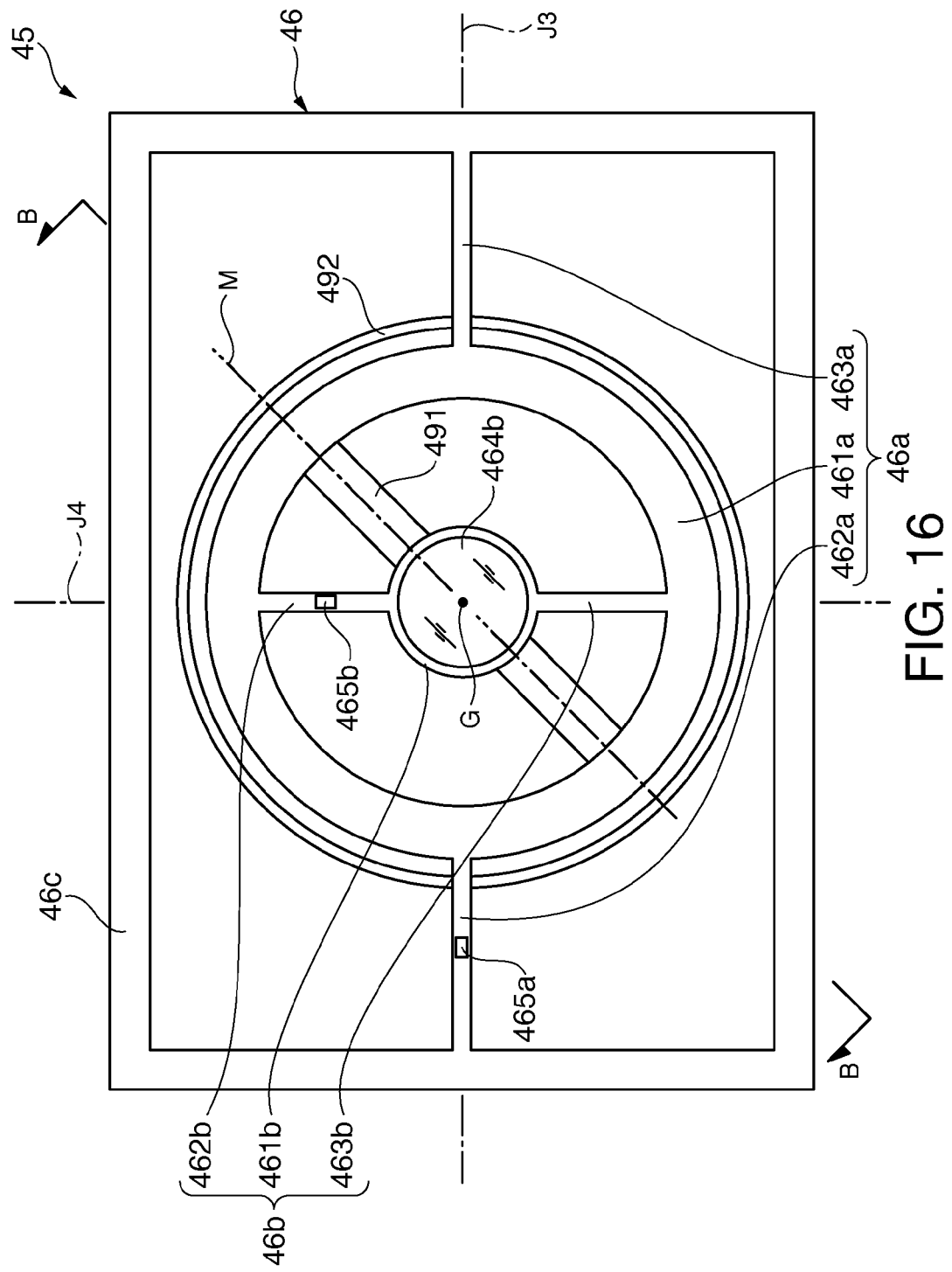
FIG. 16 is a schematic plan showing a light scanner of a projector provided in an image forming apparatus according to the third embodiment of the invention.
Figure 17:
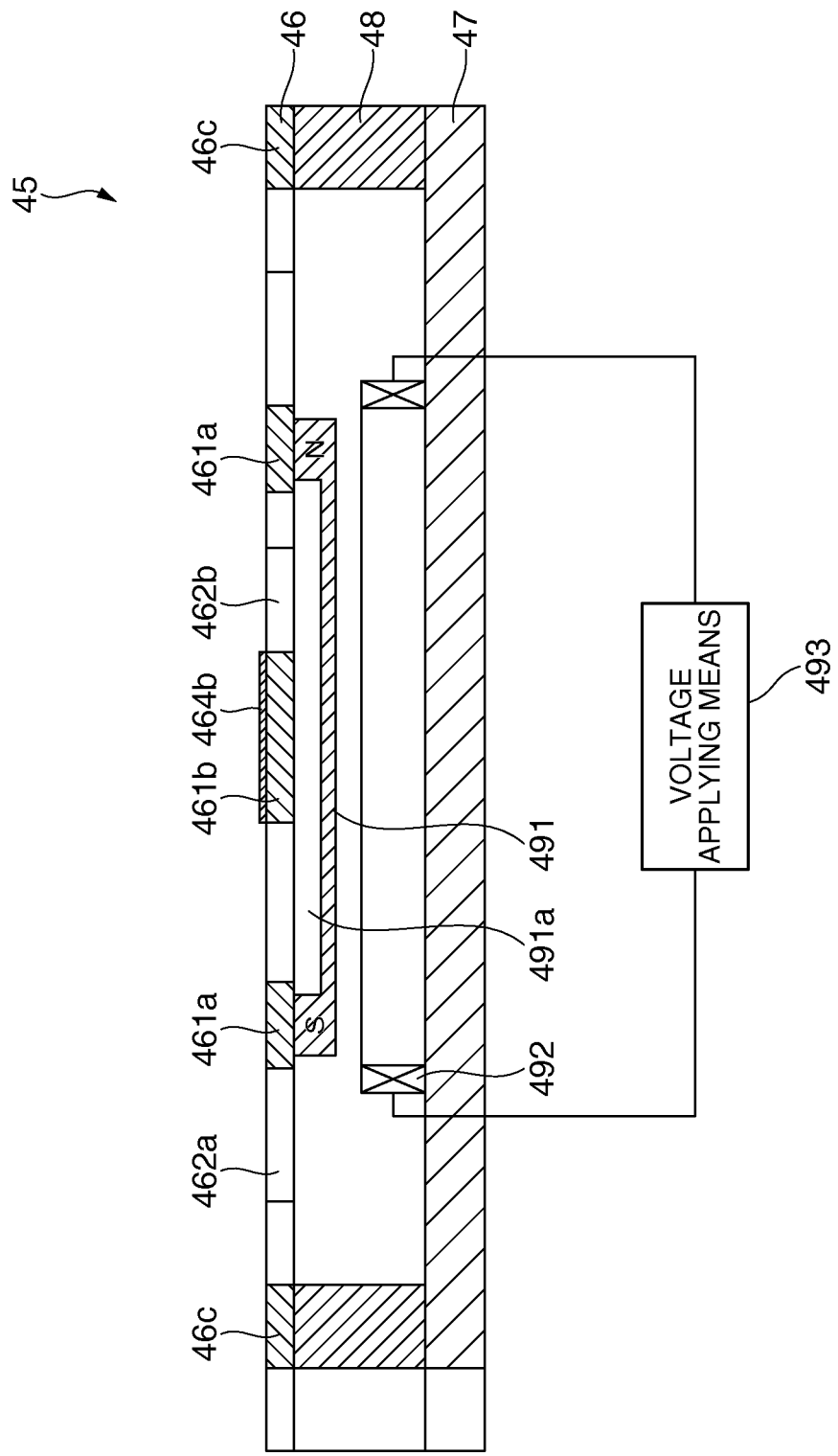
FIG. 17 is a sectional view along B-B line in FIG. 16.
Figure 18:
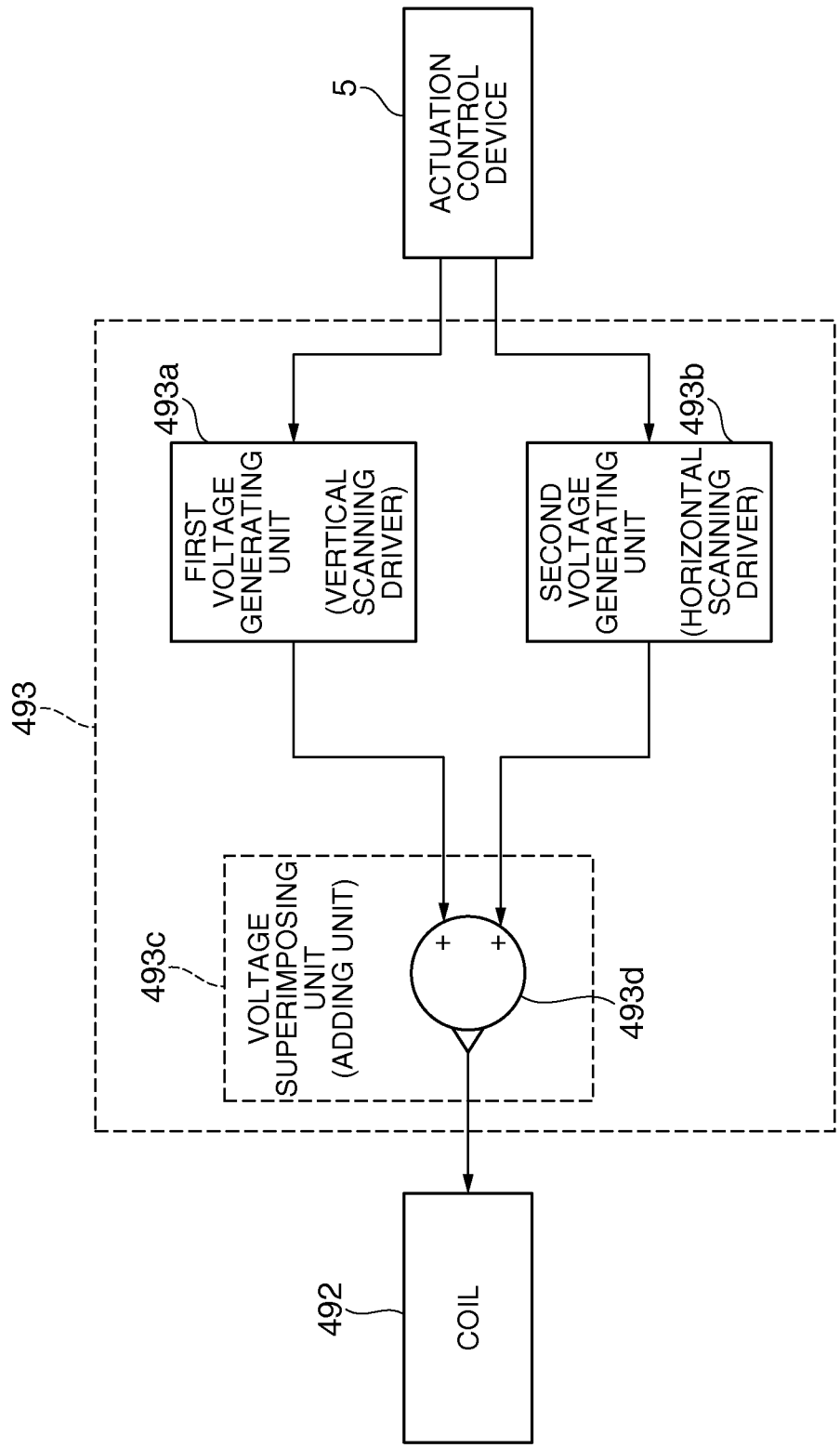
FIG. 18 is a block diagram showing a voltage applying unit of a driving unit provided in the light scanner shown in FIG. 16.
Figure 19A:
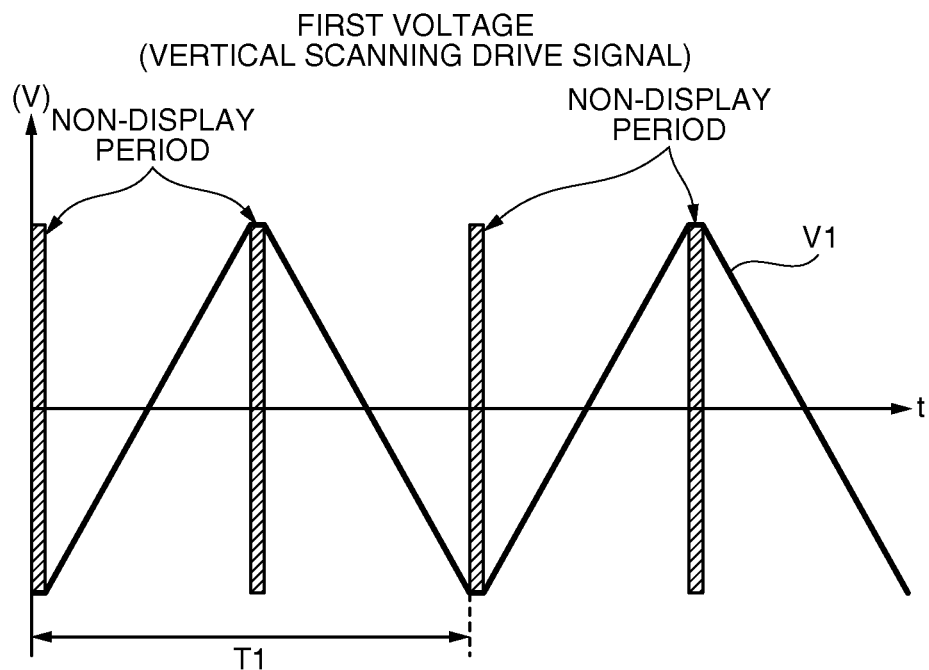
FIGS. 19A and 19B show an example of voltages generated in a first voltage generating unit and a second voltage generating unit provided in the voltage applying unit shown in FIG. 18.
Figure 19B:
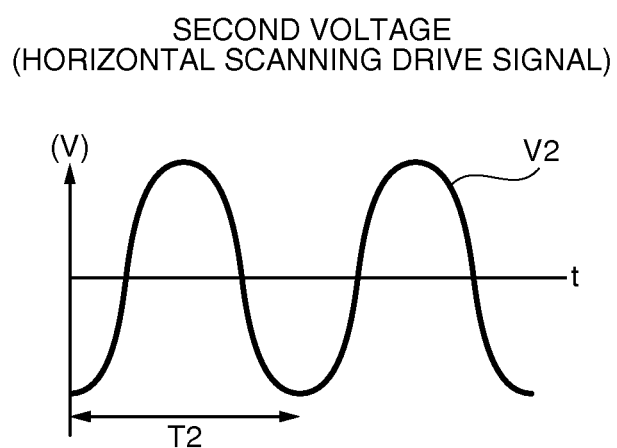

FIG. 16 is a schematic plan showing a light scanner of a projector provided in an image forming apparatus according to the third embodiment of the invention, FIG. 17 is a sectional view along B-B line in FIG. 16, FIG. 18 is a block diagram showing a voltage applying unit of a driving unit provided in the light scanner shown in FIG. 16, and FIGS. 19A and 19B show an example of voltages generated in a first voltage generating unit and a second voltage generating unit provided in the voltage applying unit shown in FIG. 18. Note that, as below, for convenience of explanation, the front side of the paper of FIG. 16 will be referred to as "up", the depth side of the paper will be referred to as "down", the right side will be referred to as "right", the left side will be referred to as "left", the upside in FIG. 17 will be referred to as "up", the downside will be referred to as "down", the right side will be referred to as "right", and the left side will be referred to as "left".

As below, the image forming apparatus of the third embodiment will be explained by centering on the differences from the above described first embodiment, and the explanation of the same matter will be omitted.

The image forming apparatus of the third embodiment is nearly the same as that of the first embodiment except that the configuration of the light scanner provided in the projector is different. In FIG. 18, the same signs are assigned to the same elements as those of the above described embodiment.

The light scanning unit in the embodiment has one light scanner 45 of the so-called two-degree-of-freedom system (two-dimensional scanning).

The light scanner 45 includes a base 46 having a first vibration system 46a, a second vibration system 46b, and a support part 46c as shown in FIG. 16, an opposed substrate 47 provided to be opposed to the base 46, a spacer member 48 provided between the base 46 and the opposed substrate 47, a permanent magnet 491, and a coil 492.

The first vibration system 46a includes a frame-shaped drive part 461a provided inside of the frame shaped support part 46c and a pair of first connection parts 462a, 463a that support the drive part 461a at both ends to the support part 46c.

The second vibration system 46b includes a movable plate 461b provided inside of the drive part 461a and a pair of second connection parts 462b, 463b that support the movable plate 461b at both ends to the drive part 461a.

The drive part 461a has an annual shape in a plan view of FIG. 16. Note that, the shape of the drive part 461a is not particularly limited as long as it has a frame shape, and, for example, may be a rectangular annular shape in the plan view of FIG. 16. To the lower surface of the drive part 461a, the permanent magnet 491 is bonded.

The first connection parts 462a, 463a respectively have longitudinal shapes and are elastically deformable. The first connection parts 462a, 463a respectively connect the drive part 461a and the support part 46c so that the drive part 461a may be rotatable relative to the support part 46c. Those first connection parts 462a, 463a are provided coaxially with each other, and the drive part 461a is adapted to rotate around the axis (hereinafter, referred to as "rotation center axis J3") relative to the support part 46c.

A piezoelectric device 465a for detecting an angle (a rotation angle around the rotation center axis J3) (behavior) of the drive part 461a is provided on the first connection part 462a.

The movable plate 461b has a circular shape in the plan view of FIG. 16. Note that, the shape of the movable plate 461b is not particularly limited as long as it may be formed inside of the drive part 461a, and, for example, it may be an elliptical shape or a rectangular shape in the plan view of FIG. 16. On the upper surface of the movable plate 461b, a light reflection part 464b having light reflectivity is formed.

The second connection parts 462b, 463b respectively have longitudinal shapes and are elastically deformable. The second connection parts 462b, 463b respectively connect the movable plate 461b and the drive part 461a so that the movable plate 461b may be rotatable relative to the drive part 461a. Those second connection parts 462b, 463b are provided coaxially with each other, and the movable plate 461b is adapted to rotate around the axis (hereinafter, referred to as "rotation center axis J4") relative to the drive part 461a.

A piezoelectric device 465b for detecting an angle (a rotation angle around the rotation center axis J4) (behavior) of the movable plate 461b is provided on the second connection part 462b.

As shown in FIG. 16, the rotation center axis J3 and the rotation center axis J4 are orthogonal to each other. Further, the centers of the drive part 461a and the movable plate 461b are respectively located on the intersection of the rotation center axis J3 and the rotation center axis J4 in the plan view of FIG. 16. Note that, as below, for convenience of explanation, the intersection of the rotation center axis J3 and the rotation center axis J4 may be referred to as "intersection G".

As shown in FIG. 17, the above described base 46 is bonded to the opposed substrate 47 via the spacer member 48. On the upper surface of the opposed substrate 47, the coil 492 that generates a magnetic field acting on the permanent magnet 491 is provided.

The permanent magnet 491 is provided along a line segment passing through the intersection G and tilted relative to the respective axes of the rotation center axis J3 and the rotation center axis J4 (the line segment may be referred to as "line segment M") in the plan view of FIG. 16. The permanent magnet 491 has one side in the longitudinal direction relative to the intersection G as an S-pole and the other side as an N-pole. In FIG. 17, the left side of the permanent magnet 491 in the longitudinal direction is the S-pole and the right side is the N-pole.

In the plan view of FIG. 16, the tilt angle θ of the line segment M relative to the rotation center axis J3 is preferably 30 to 60 degrees, more preferably 40 to 50 degrees, and even more preferably nearly 45 degrees. By thus providing the permanent magnet 491, the movable plate 461b may smoothly be rotated around the respective axes of the rotation center axis J3 and the rotation center axis J4. In the embodiment, the line segment M is tilted at about 45 degrees relative to the respective axes of the rotation center axis J3 and the rotation center axis J4.

Further, as shown in FIG. 17, on the upper surface of the permanent magnet 491, a recess part 491a is formed. The recess part 491a is a retraction part for preventing the contact between the permanent magnet 491 and the movable plate 461b. By forming the recess part 491a, the movable plate 461b may be prevented from contacting the permanent magnet 491 when rotating around the rotation center axis J3.

The coil 492 is formed to surround the outer periphery of the drive part 461a in the plan view of FIG. 16. Thereby, when the light scanner 45 is driven, the contact between the drive part 461a and the coil 492 may reliably be prevented. As a result, the separation distance between the coil 492 and the permanent magnet 491 may be relatively shorter, and the magnetic field generated from the coil 492 may efficiently be allowed to act on the permanent magnet 491.

The coil 492 is electrically connected to a voltage applying unit 493, and, when a voltage is applied to the coil 492 by the voltage applying unit 493, magnetic fields in axial directions orthogonal to the respective axes of the rotation center axis J3 and the rotation center axis J4 are generated from the coil 492.

As shown in FIG. 18, the voltage applying unit 493 includes a first voltage generating unit 493a that generates a first voltage V1 for rotating the movable plate 461b around the rotation center axis J3, a second voltage generating unit 493b that generates a second voltage V2 for rotating the movable plate 461b around the rotation center axis J4, and a voltage superimposing unit 493c that superimposes the first voltage V1 and the second voltage V2 and applies the voltage to the coil 492.

The first voltage generating unit 493a generates the first voltage V1 (voltage for vertical scanning) that periodically changes in a period T1 twice the frame frequency as shown in FIG. 19A.

The first voltage V1 has a saw-tooth waveform. Accordingly, the light scanner 45 can effectively perform vertical reciprocating scanning (sub-scanning) with light. Note that the waveform of the first voltage V1 is not limited to that. Here, the frequency (1/T1) of the first voltage V1 is not particularly limited as long as it is a frequency suitable for vertical scanning, but preferably 15 to 40 Hz (about 30 Hz).

In the embodiment, the frequency of the first voltage V1 is adjusted to be a frequency different from a torsional resonance frequency of the first vibration system 46a formed by the drive part 461a and the pair of first connection parts 462a, 463a.

On the other hand, the second voltage generating unit 493b generates the second voltage V2 (voltage for horizontal scanning) that periodically changes in a period T2 different from the period T1 as shown in FIG. 19B.

The second voltage V2 has a sinusoidal waveform. Accordingly, the light scanner 45 can effectively perform main scanning with light. Note that the waveform of the second voltage V2 is not limited to that.

Further, the frequency of the second voltage V2 is not particularly limited as long as it is higher than the frequency of the first voltage V1 and suitable for horizontal scanning, but preferably 10 to 40 kHz. By setting the frequency of the second voltage V2 to 10 to 40 kHz and setting the frequency of the first voltage V1 to about 30 Hz as described above, the movable plate 461b may be rotated around the respective axes of the rotation center axis J3 and the rotation center axis J4 at the frequencies suitable for drawing on the display surface 91. Note that the combination of the frequency of the first voltage V1 and the frequency of the second voltage V2 is not particularly limited as long as the movable plate 461b may be rotated around the respective axes of the rotation center axis J3 and the rotation center axis J4.

In the embodiment, the frequency of the second voltage V2 is adjusted to be equal to the torsional resonance frequency of the second vibration system 46b formed by the movable plate 461b and the pair of second connection parts 462b, 463b. Thereby, the rotation angle of the movable plate 461b around the rotation center axis J3 may be made larger.

Further, given that the resonance frequency of the first vibration system 46a is $f_1$ [Hz] and the resonance frequency of the second vibration system 46b is $f_2$ [Hz], it is preferable that $f_2$ and $f_1$ satisfy the relationship $f_2 > f_1$, and more preferable that they satisfy the relationship $f_2 \geq 10 f_1$. Thereby, while the movable plate 461b is more smoothly rotated at the frequency of the first voltage V1 around the rotation center axis J3, the plate may be rotated at the frequency of the second voltage V2 around the rotation center axis J4.

The first voltage generating unit 493a and the second voltage generating unit 493b are respectively connected to the actuation control device 5 and driven based on the signals from the actuation control device 5. To the first voltage generating unit 493a and the second voltage generating unit 493b, the voltage superimposing unit 493c is connected.

The voltage superimposing unit 493c includes an adder 493d for applying a voltage to the coil 492. The adder 493d receives the first voltage V1 from the first voltage generating unit 493a and receives the second voltage V2 from the second voltage generating unit 493b, and superimposes these voltages and applies it to the coil 492.

The light scanner 45 having the above described configuration is driven in the following manner.

For example, the first voltage V1 as shown in FIG. 19A and the second voltage V2 as shown in FIG. 19B are superimposed by the voltage superimposing unit 493c, and the superimposed voltage is applied to the coil 492 (the superimposed voltage may be referred to as "voltage V3").

Then, by the voltage corresponding to the first voltage V1 in the voltage V3, the magnetic field that tends to attract the S-pole side of the permanent magnet 491 to the coil 492 and separate the N-pole side from the coil 492 and the magnetic field that tends to separate the S-pole side of the permanent magnet 491 from the coil 492 and attract the N-pole side to the coil 492 are alternately switched. Thereby, while the first connection parts 462a, 463a are torsionally deformed, the drive part 461a rotates around the rotation center axis J3 at the frequency of the first voltage V1 together with the movable plate 461b.

Note that the frequency of the first voltage V1 is set extremely lower than the frequency of the second voltage V2, and further, the resonance frequency of the first vibration system 46a is designed lower than the resonance frequency of the second vibration system 46b. Accordingly, the first vibration system 46a is easier to vibrate than the second vibration system 46b, and the movable plate 461b may be prevented from rotating around the rotation center axis J4 due to the first voltage V1.

On the other hand, by the voltage corresponding to the second voltage V2 in the voltage V3, the magnetic field that tends to attract the S-pole side of the permanent magnet 491 to the coil 492 and separate the N-pole side from the coil 492 and the magnetic field that tends to separate the S-pole side of the permanent magnet 491 from the coil 492 and attract the N-pole side to the coil 492 are alternately switched. Thereby, while the second connection parts 462b, 463b are torsionally deformed, the movable plate 461b rotates around the rotation center axis J4 at the frequency of the second voltage V2.

Note that, since the frequency of the second voltage V2 is equal to the torsional resonance frequency of the second vibration system 46b, the movable plate 461b may dominantly be rotated around the rotation center axis J4 by the second voltage V2. Accordingly, the movable plate 461b may be prevented from rotating around the rotation center axis J3 together with the drive part 461a due to the second voltage V2.

According to the above described light scanner 45, two-dimensional scanning may be performed with the laser beam (light) using one actuator, and space saving of the light scanning unit 4 may be realized. Further, for example, in the case where the pair of light scanners are used as in the first embodiment, the relative positional relationship between the light scanners should be set with high accuracy, however, there is no need of that in the embodiment and the easier manufacturing may be realized.

According to the third embodiment, the same effect as that of the first embodiment may be exerted.

As described above, the image forming apparatus of the invention has been explained according to the illustrated embodiments, however, the invention is not limited to those, but the configurations of the respective parts may be replaced by arbitrary configurations having the same functions. Further, other arbitrary configurations may be added to the invention. Furthermore, the invention may be a combination of any two or more configurations (features) of the respective embodiments.

In addition, in the above described embodiments, the case where images for plural frames are displayed by repeating drawing from the upper left to the lower right of the drawing region 911 has been explained, however, the images for plural frames may be displayed by alternately repeating frames for drawing from the upper left to the lower right of the drawing region 911 and frames for drawing from the lower right to the upper left of the drawing region 911. In this case, the order of the video data (pixel data) read out from the video data storage unit 51 may be reversed between the even-numbered frames and odd-numbered frames.

Further, in the embodiment, the case where the position in which drawing is started with respect to each frame is at the upper left has been explained, however, not limited to that, but, for example, the position in which drawing is started with respect to each frame may be at the upper right, the lower left, the lower right, or the like.

Furthermore, in the above described embodiments, the case where the light output from the projector is nearly orthogonal to the display surface has been explained as an example for convenience of explanation, however, the invention may be applied to the case where the light output from the projector is tilted relative to the display surface. In this case, according to need, the deflection angle of the movable plate in at least one direction of the vertical direction and the horizontal direction is adjusted or the modulation of the light output unit is adjusted, and thereby, the so-called keystone correction is performed.

In addition, in the first embodiment, the pair of light scanners have been used as the light scanning unit, however, not limited to that, for example, a light scanner and a galvanometer mirror may be used. In this case, the galvanometer mirror is preferably used for vertical scanning.

Further, in the above described embodiments, the case where the image forming apparatus includes one projector has been explained, however, not limited to that, but the number of projectors provided in the image forming apparatus may be two or more. In this case, the plural projectors may be actuated in synchronization with one another.

Furthermore, in the embodiment, the first direction has been set to "horizontal direction" and the second direction has been set to "vertical direction", however, in the invention, not limited to that, but, for example, the first direction may be set to "vertical direction" and the second direction may be set to "horizontal direction".

In addition, in the embodiment, one laser beam (light) is output by coupling the red laser beam, the green laser beam, and the blue laser beam using three dichroic mirrors, however, they may be coupled using a dichroic prism or the like.

Further, in the above described embodiments, the configuration in which the light source unit 3 has the laser beam source that outputs the red laser, the laser beam source that outputs the blue laser, and the laser beam source that outputs the green laser has been explained, however, not limited to that, but, for example, the unit may have the laser beam source that outputs the red laser, the laser beam source that outputs the blue laser, and a laser beam source that outputs a ultraviolet laser. In this case, a fluorescent material that generates green fluorescence by radiation of the ultraviolet laser is contained in the display surface. Thereby, full-color images may be displayed on the display surface.

The entire disclosure of Japanese Patent Application No. 2010-089271, filed Apr. 8, 2010 is expressly incorporated by reference herein.

What is claimed is:

1. An image forming apparatus comprising:
    a light output unit that outputs light;
    a light scanning unit that includes at least one light reflection part reflecting the light output from the light output unit, and scans a display surface in a first direction at a first speed and scans the display surface in a second direction orthogonal to the first direction at a second speed lower than the first speed with the light reflected by the light reflection part, and
    an angle control part that controls a deflection angle of the light reflection part by combining at least two periods of a period in which the deflection angle of the light reflection part in the first direction is increased, a period in which the deflection angle is decreased, and a period in which the deflection angle is maintained constant while the light reflection part performs scanning with light once.

2. The image forming apparatus according to claim 1, wherein the angle control part controls the deflection angle of the light reflection part for scanning in the first direction based on image information containing information on a shape of the image to be displayed on the display surface.

3. The image forming apparatus according to claim 2, wherein the angle control part controls the deflection angle of the light reflection part for scanning in the first direction so that an outer shape of the drawable region in which the image can be formed on the display surface by scanning with the light may correspond to an outer shape of the image to be displayed on the display surface.

4. The image forming apparatus according to claim 1, wherein the angle control part controls the deflection angle of the light reflection part for scanning in the first direction based on display surface information containing information on a shape of a display object having the display surface.

5. The image forming apparatus according to claim 1, wherein the light scanning unit includes a drive part that rotates the light reflection part by periodically changing supply of a current or a voltage, and
    the angle control part controls the deflection angle of the light reflection part for scanning in the first direction by adjusting a magnitude or a frequency of the current or the voltage.

6. The image forming apparatus according to claim 1, wherein the light output unit outputs a laser beam.

* * * * *